May 5, 1964 H. R. CLOOTS ETAL 3,131,435
MANUFACTURE OF CELLULOSIC PRODUCTS
Filed Nov. 10, 1958 19 Sheets-Sheet 1

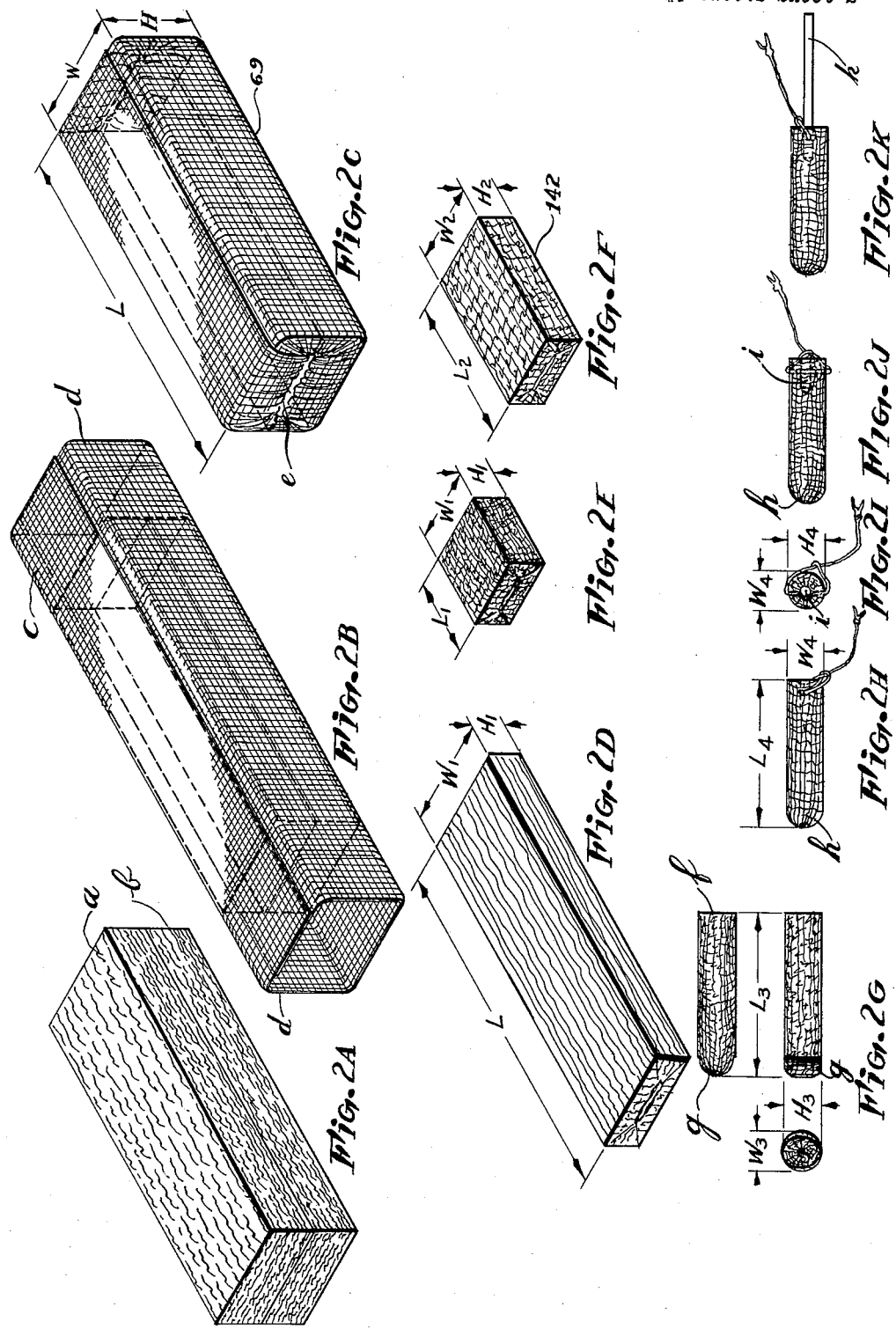

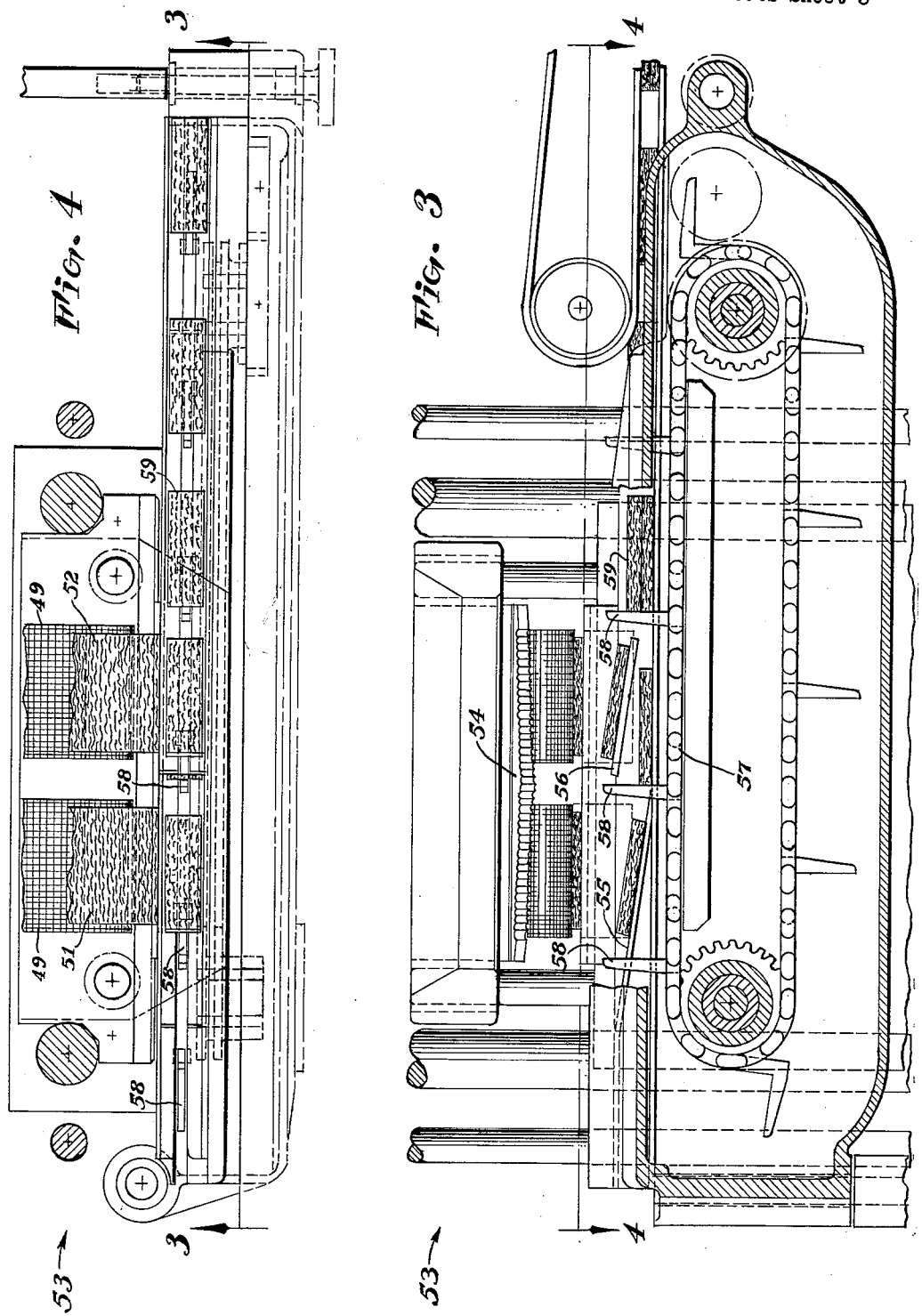

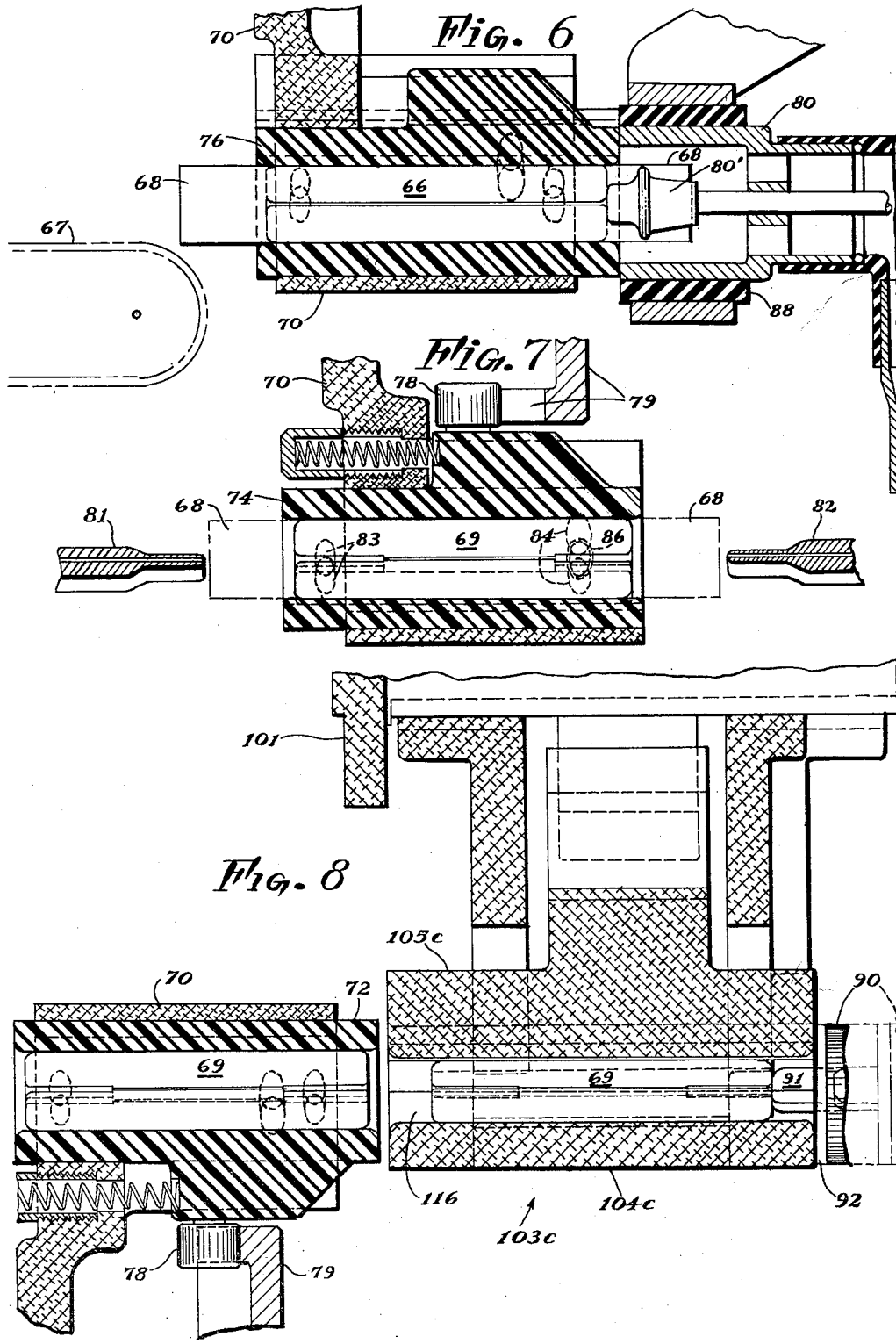

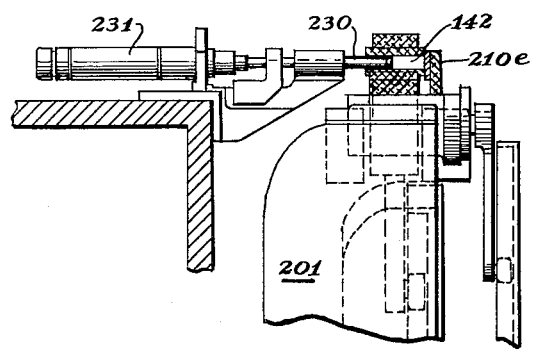
Fig. 25
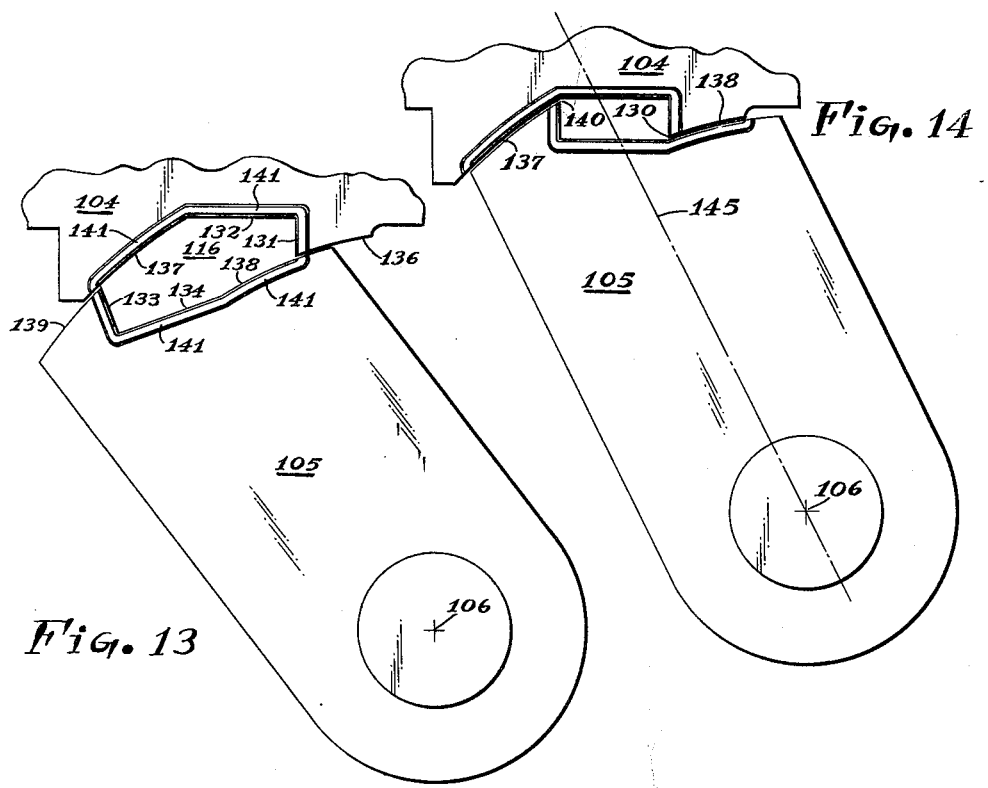
Fig. 14
Fig. 13

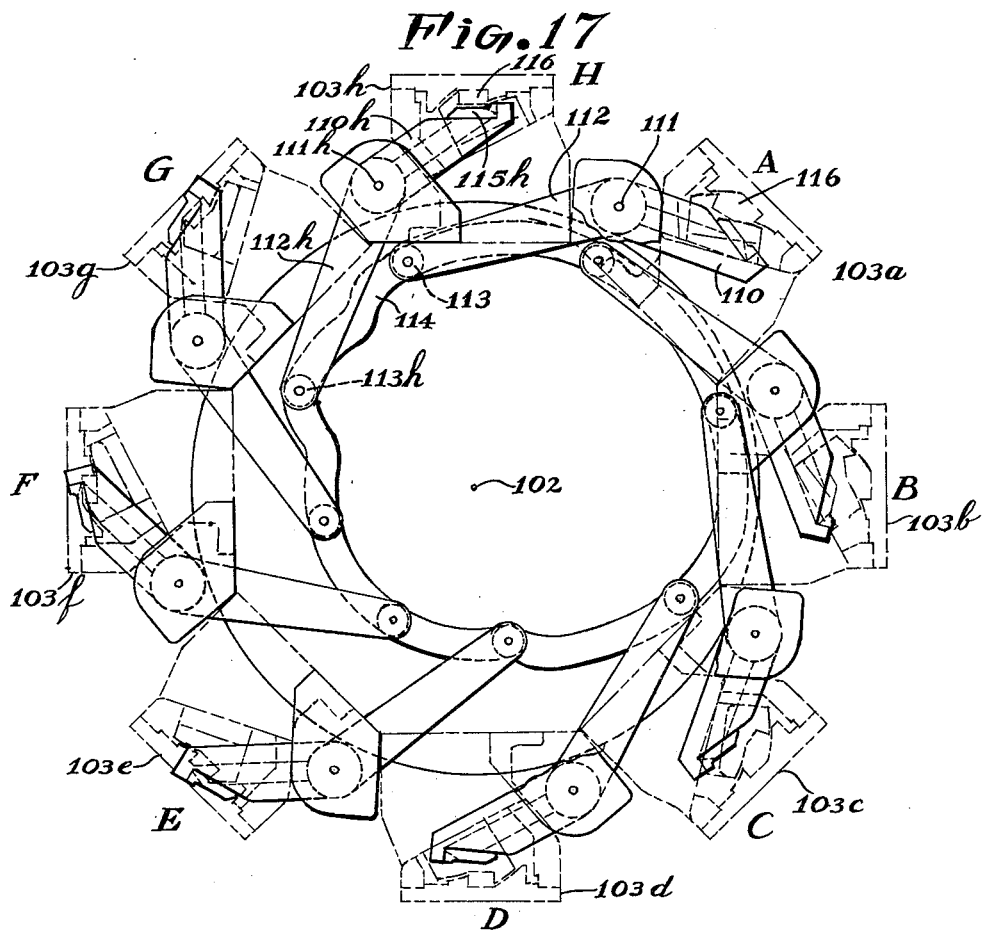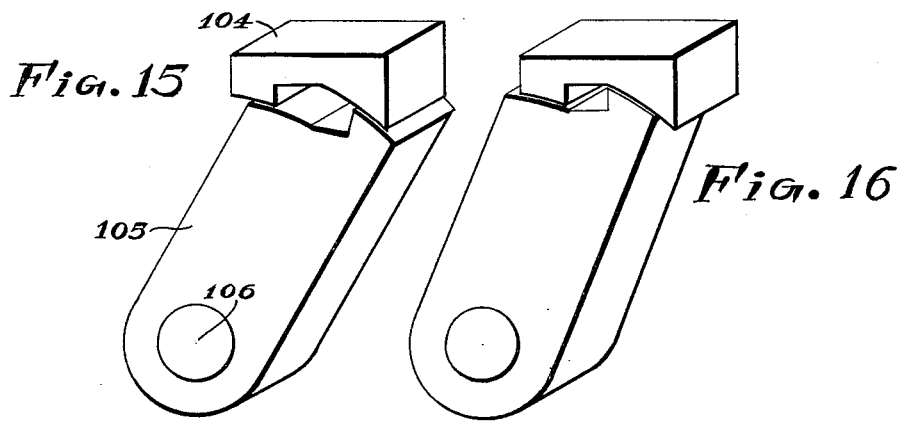

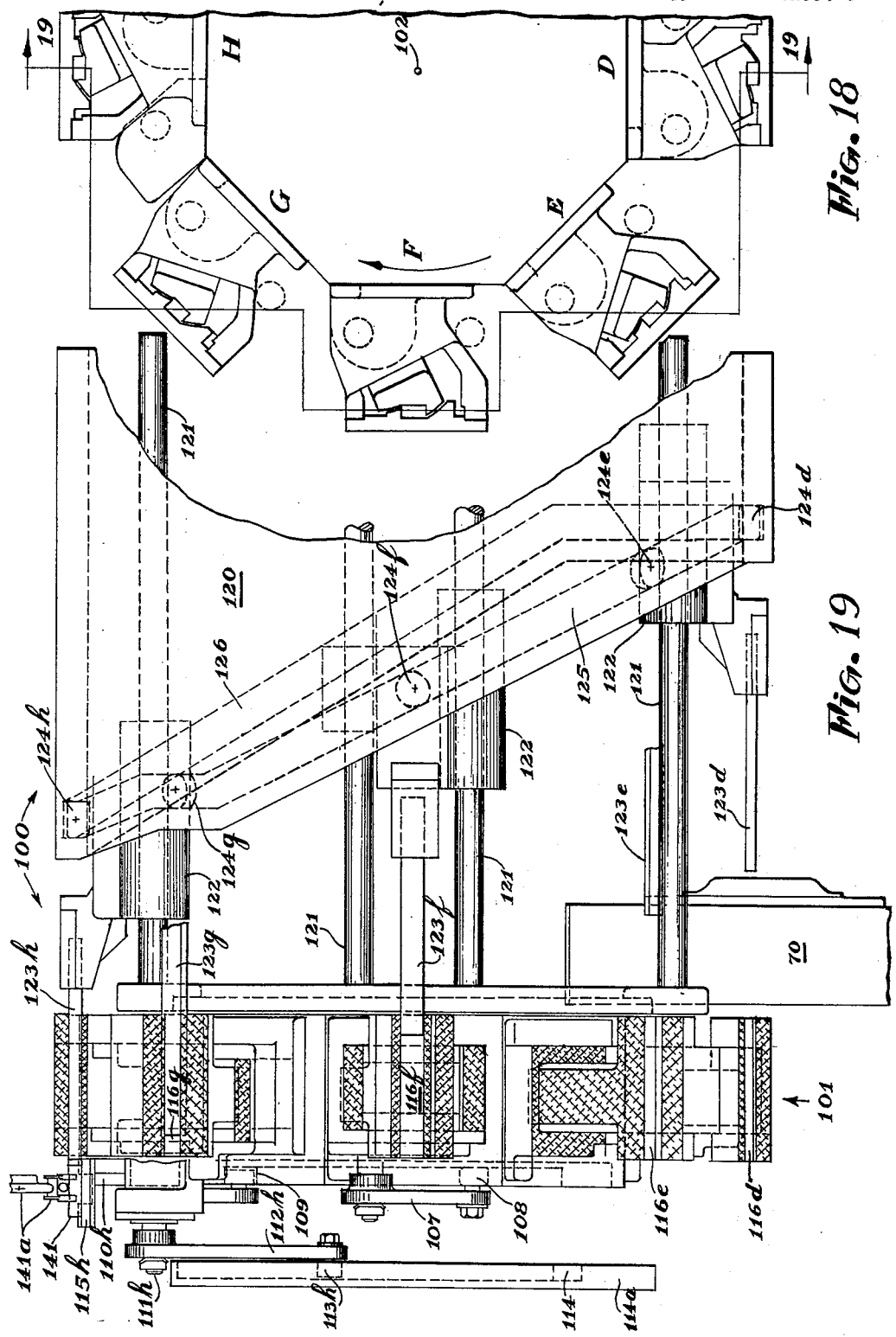

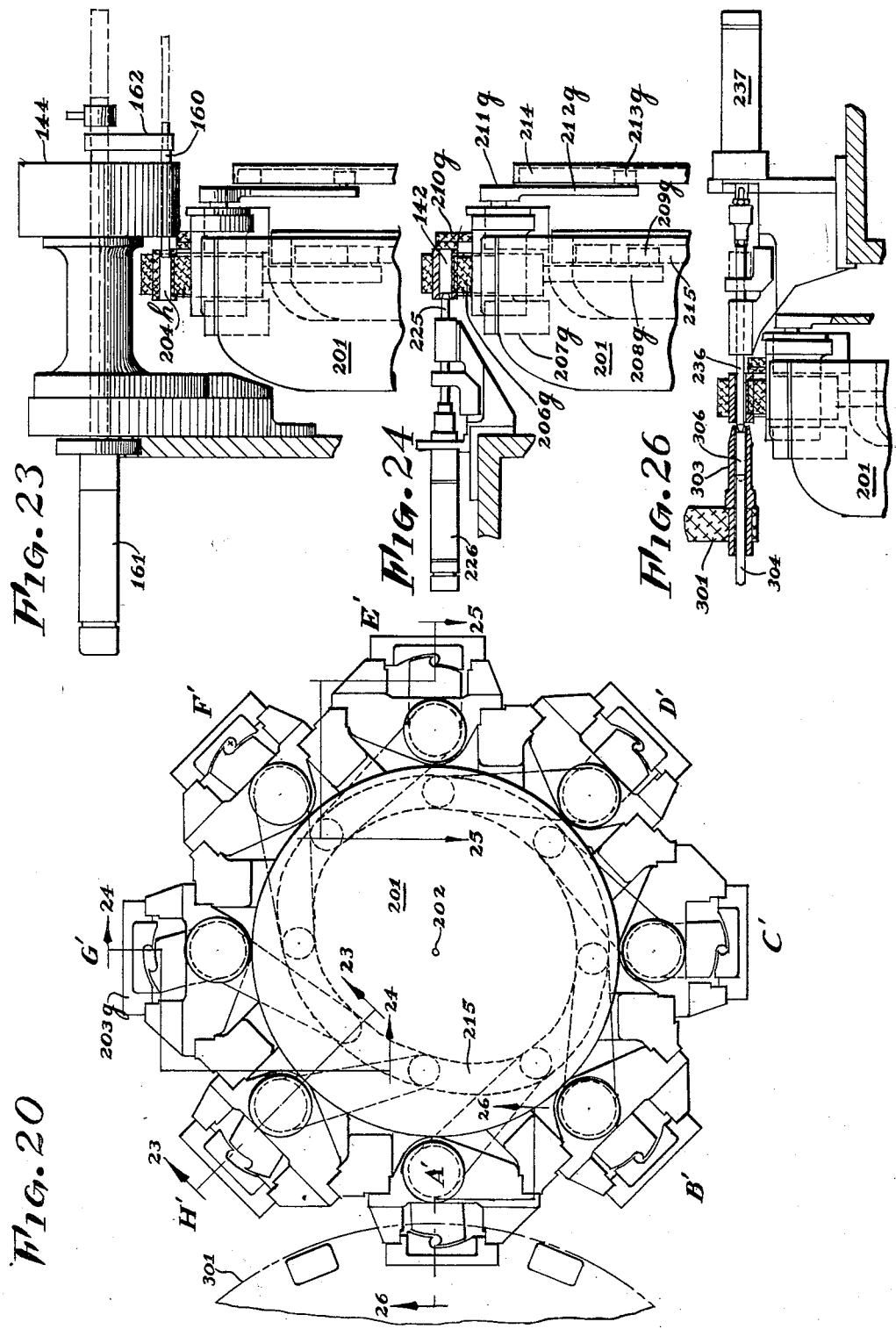

May 5, 1964 H. R. CLOOTS ETAL 3,131,435
MANUFACTURE OF CELLULOSIC PRODUCTS
Filed Nov. 10, 1958 19 Sheets-Sheet 11

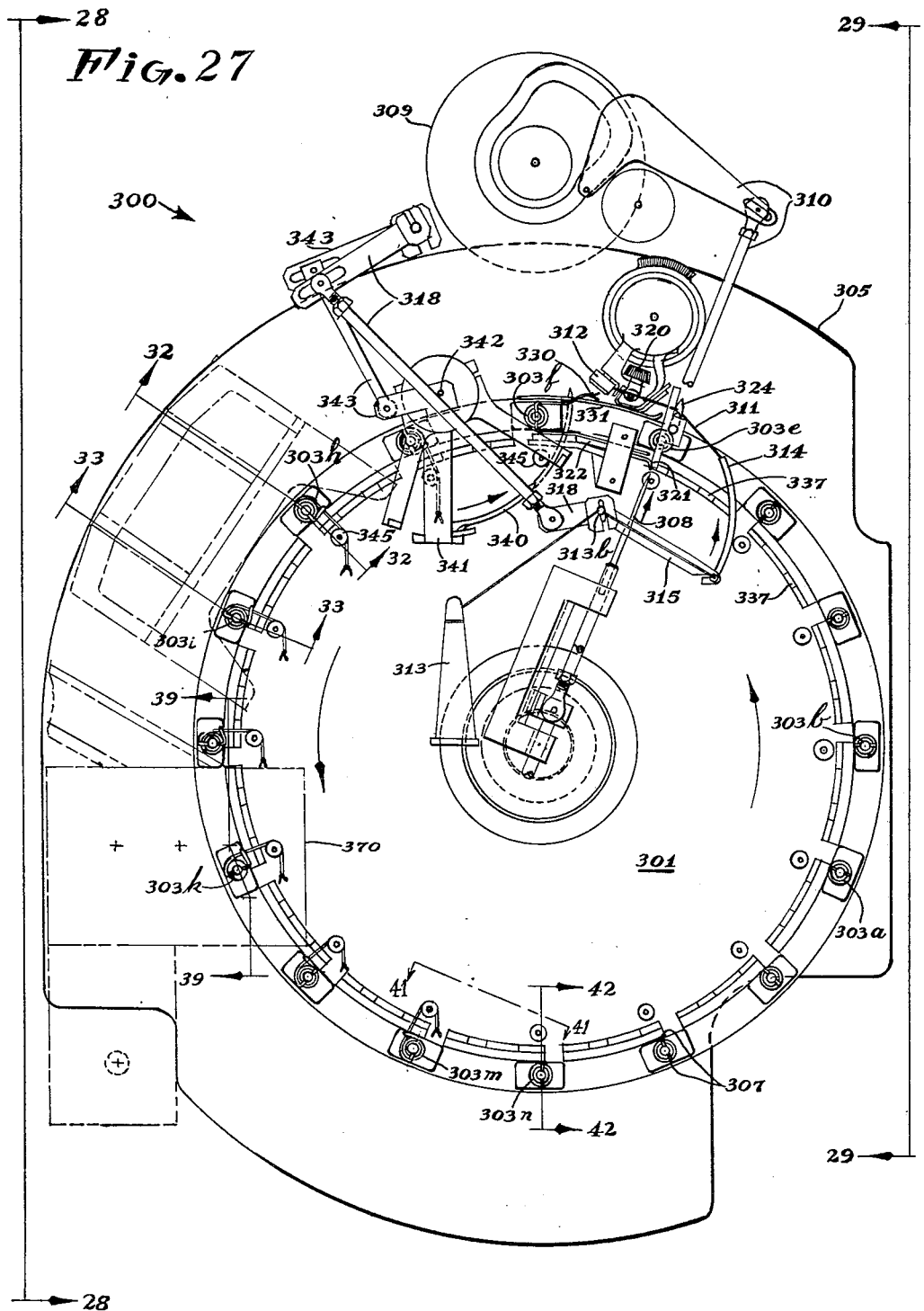

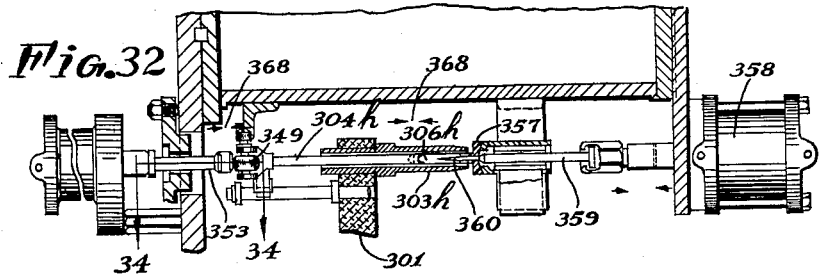
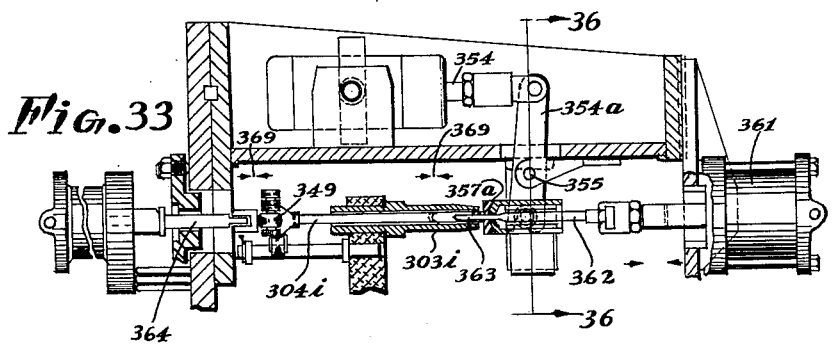
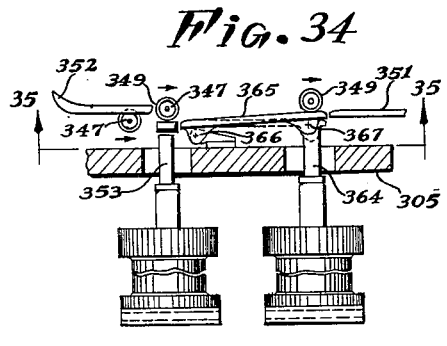
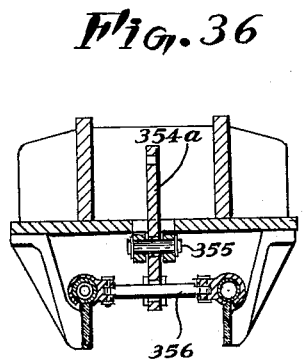
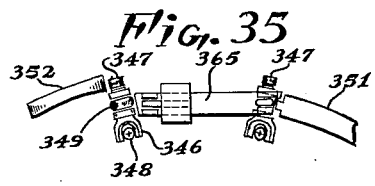

May 5, 1964  H. R. CLOOTS ETAL  3,131,435
MANUFACTURE OF CELLULOSIC PRODUCTS
Filed Nov. 10, 1958  19 Sheets-Sheet 17

May 5, 1964     H. R. CLOOTS ETAL     3,131,435
MANUFACTURE OF CELLULOSIC PRODUCTS
Filed Nov. 10, 1958     19 Sheets-Sheet 19

United States Patent Office 3,131,435
Patented May 5, 1964

3,131,435
MANUFACTURE OF CELLULOSIC PRODUCTS
Henry Robert Cloots, Neenah, Charles Arthur Henderson, Appleton, and Edward Rightor, Jr., Neenah, Wis., assignors to Kimberly-Clark Corporation, Neenah, Wis., a corporation of Delaware
Filed Nov. 10, 1958, Ser. No. 773,020
28 Claims. (Cl. 19—144.5)

This invention relates to the manufacture of cellulosic products and more particularly to method and apparatus for manufacturing sanitary products such as tampons, sanitary napkins, and medical sponges and bandages.

Sanitary products such as tampons are made of absorbent fibrous or other suitable material highly compressed to a dense mass of small size and suitable shape for easy insertion, being so tightly compacted that in storage the tampon substantially retains its compressed size and shape, yet it re-expands rapidly when wetted, providing a highly absorptive body which comfortably fits the vaginal cavity, and is easily withdrawn by means of a withdrawal cord attached thereto. Preferably, an inserted stick is also provided for ease of insertion.

One of the objects of this invention is to provide improved method and apparatus for compressing tampons. Another object is to provide improved method and apparatus for attaching a withdrawal cord to a tampon. Another object is to provide method and apparatus for forming a recess in a tampon for receiving an inserter stick.

Another object of the invention is to provide improvements of the method and apparatus disclosed in the co-pending application by John C. Bletzinger et al., Serial No. 578,107, filed April 13, 1956 (Patent No. 2,926,394, issued March 1, 1960). In one form of apparatus disclosed in that application, an uncompressed mass of suitable fibrous material is first enclosed in gauze or other suitable cover material; a withdrawal cord is then attached to one end of this block; the mass is then precompressed in three directions in succession, the first two directions being transverse, a longitudinal recess for reception of an inserter stick being formed coincidentally with the longitudinal compression; the mass is then released and allowed to re-expand; the precompressed block is then recompressed longitudinally with additional forming of the inserter stick recess, and while being thus held longitudinally compressed, the material is compressed transversely a second time to form it into the shape of the finished tampon. Although that process and apparatus produce a tampon of high quality, both the method and apparatus have certain shortcomings. They are not readily adaptable to high speed production in automatic machinery. That is, the sequence of the process steps does not with complete satisfaction lend itself to embodiment in automatic machinery, and the apparatus can produce tampons at only a comparatively slow rate. Furthermore, as a consequence of attaching the string before any of the compression steps, the withdrawal cord is apt to catch in the machinery. The disclosed apparatus is so constructed that the direction of movement of the tampon material must be reversed to remove it from each die, i.e. it must go back out the side it went in. This not only slows production but leads to an accumulation of fibers and extraneous foreign matter in or between the working parts in which the material is compressed, which at erratic intervals may loosen and become attached to the tampon, a most undesirable fault in a sanitary product. According to the present invention the withdrawal cord is attached to the tampon after it has been compressed to, or almost to, the shape and size of the finished tampon. Similarly, the inserter stick hole is formed after the tampon blank has been compressed substantially to its final dimensions, and subsequent to, or coincident with, the final external shaping of the tampon. Surprisingly, it is found that it is easier to perform those two operations (string attaching, and stick hole forming) at or near the end of the process than before any compression, or (as to the formation of the stick hole) during compression. Another important feature of the present invention is that the first transverse compressions in width and height are performed simultaneously instead of in sequence. This speeds production and provides more uniform compression. Another feature of the present invention as compared to the Bletzinger et al. process is that the tampon blank is twice compressed longitudinally, once after each of two transverse compressions. The first longitudinal compression reduces the tampon blank to less than, or approximately to the same length as the finished tampon. The second transverse compression re-expands the blank longitudinally beyond the length of the finished tampon, with incidental partial formation of a rounded tip. Thereafter, the blank is subjected to additional longitudinal compression to reduce it to the final tampon shape and size. Another feature of the present invention is that, upon completion of the compression steps, the tampon material is released longitudinally. These improvements over the process disclosed by Bletzinger et al. make it possible to perform the process in high-speed, automatic machinery, and the apparatus in accordance with the present invention makes available automatic machinery capable of the mass production of high quality, highly compressed tampons.

Tampons produced in accordance with the present invention have improved characteristics. The surfaces are interlaced with numerous and fine folds or creases which cross each other longitudinally and transversely. The resulting tampon has improved characteristics as compared to those produced by the method and apparatus disclosed in the Bletzinger et al. application mentioned above. The tampon is more uniformly compacted throughout, and particularly around the inserter stick hole, and when wetted it expands more uniformly and more quickly. It also holds its shape better in storage. The advantages of the present process are particularly important when the absorbent mass includes resilient fibers, such as disclosed in the patent to Bletzinger, No. 2,761,449.

Another advantage of the apparatus in accordance with the present invention is that the apparatus touched by the tampon material is kept clean by the passage of the material because, except at the very end of the apparatus, the tampon material does not reverse its direction of movement through any piece of apparatus. The material is fed axially into a tucker turret and into successive precompressor and compressor dies from one end of each chamber and leaves through the opposite end of the same chamber. In this way the dies are self-cleaning, and a higher production rate is attained.

Another object of the present invention is to provide improved precompressor and compressor dies and assemblies for tampon manufacture. Another object is to provide apparatus which automatically controls the orientation of the product throughout the apparatus so that the withdrawal cord may be inserted through the compressed tampons in the proper direction with respect to the original orientation of the uncompressed fibrous mass, to facilitate insertion of this cord and to insure that it is oriented to best advantage. Another object is to provide improved means for controlling the free end of the withdrawal cord after it has been attached to the tampon, as well as improved means for keeping the string under control during the string attaching operation.

Other objects and advantages of the present invention will become apparent to those skilled in the art from the following description and the appended drawings wherein;

FIGS. 2A to 2K illustrate the steps of the process in accordance with the invention;

FIG. 3 is a front elevation of the batt cutter and stacker with cover (indicated in dot and dash lines) removed, and taken along line 3—3 of FIG. 4;

FIG. 4 is a section taken on line 4—4 of FIG. 3;

Figure 5:
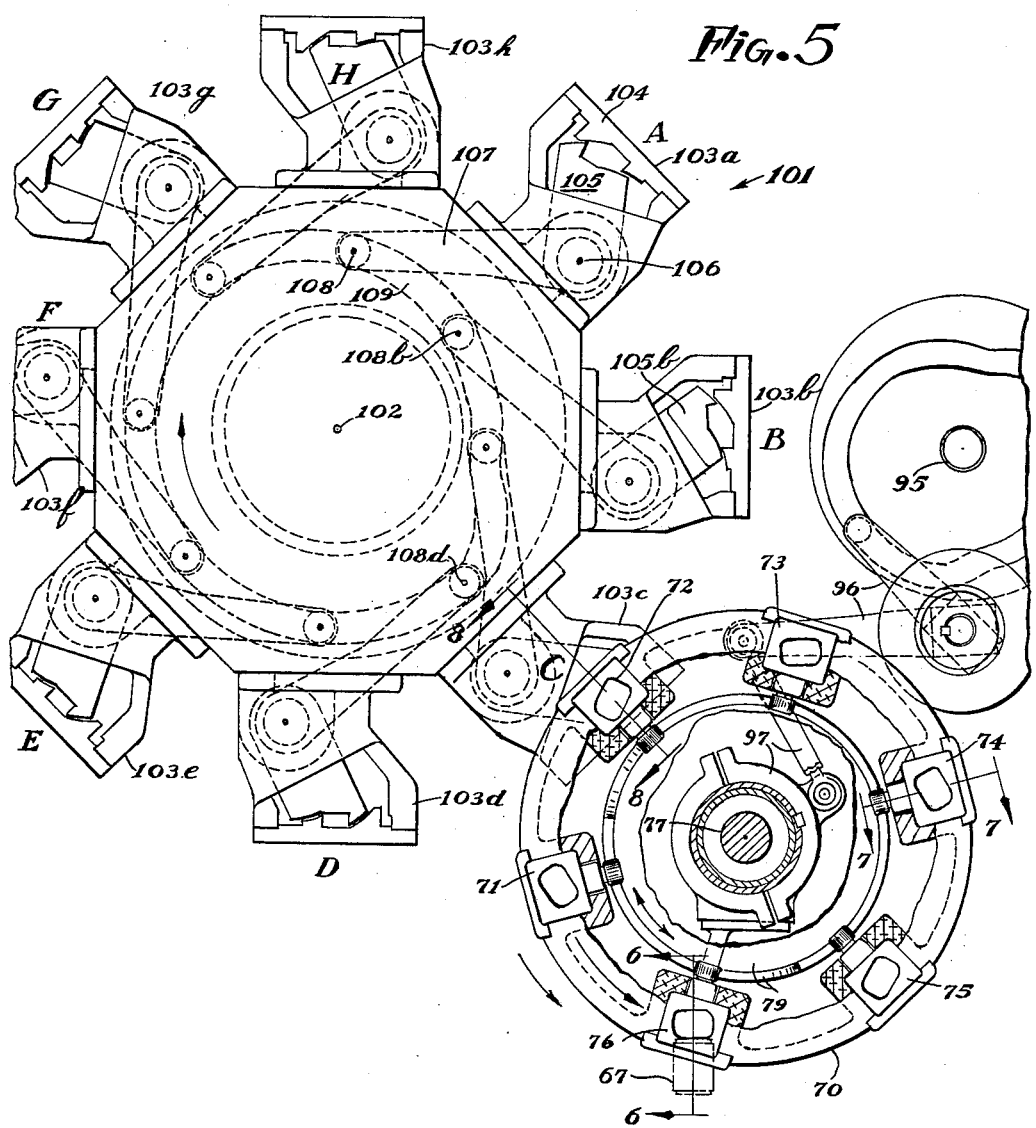
FIG. 5 is an elevation showing the relationship of the tucker turret and precompressor turret.
Figure 21:
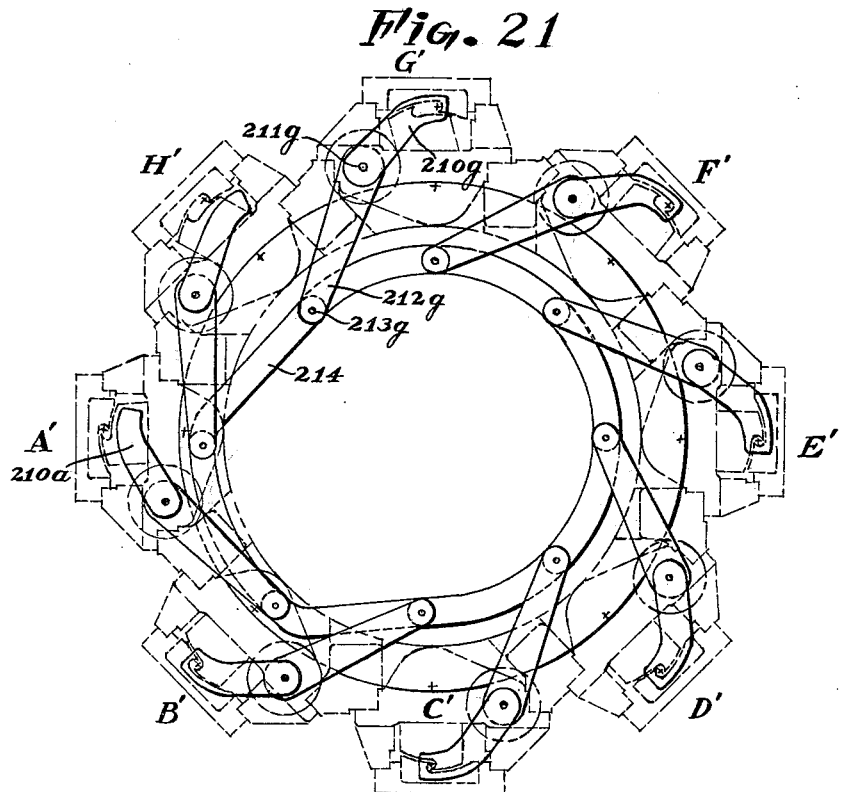
Figure 22:
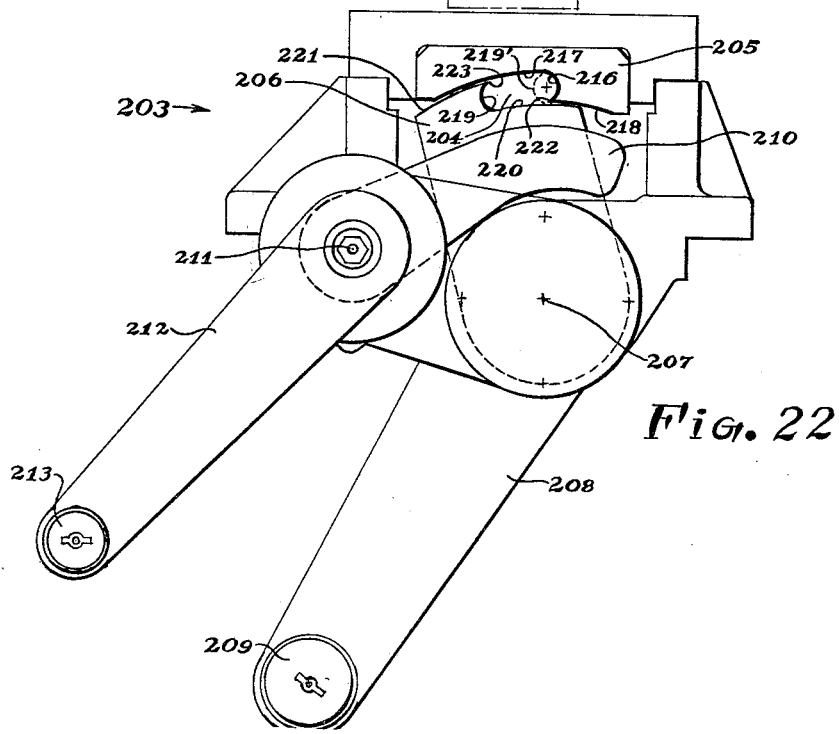
Figure 28:
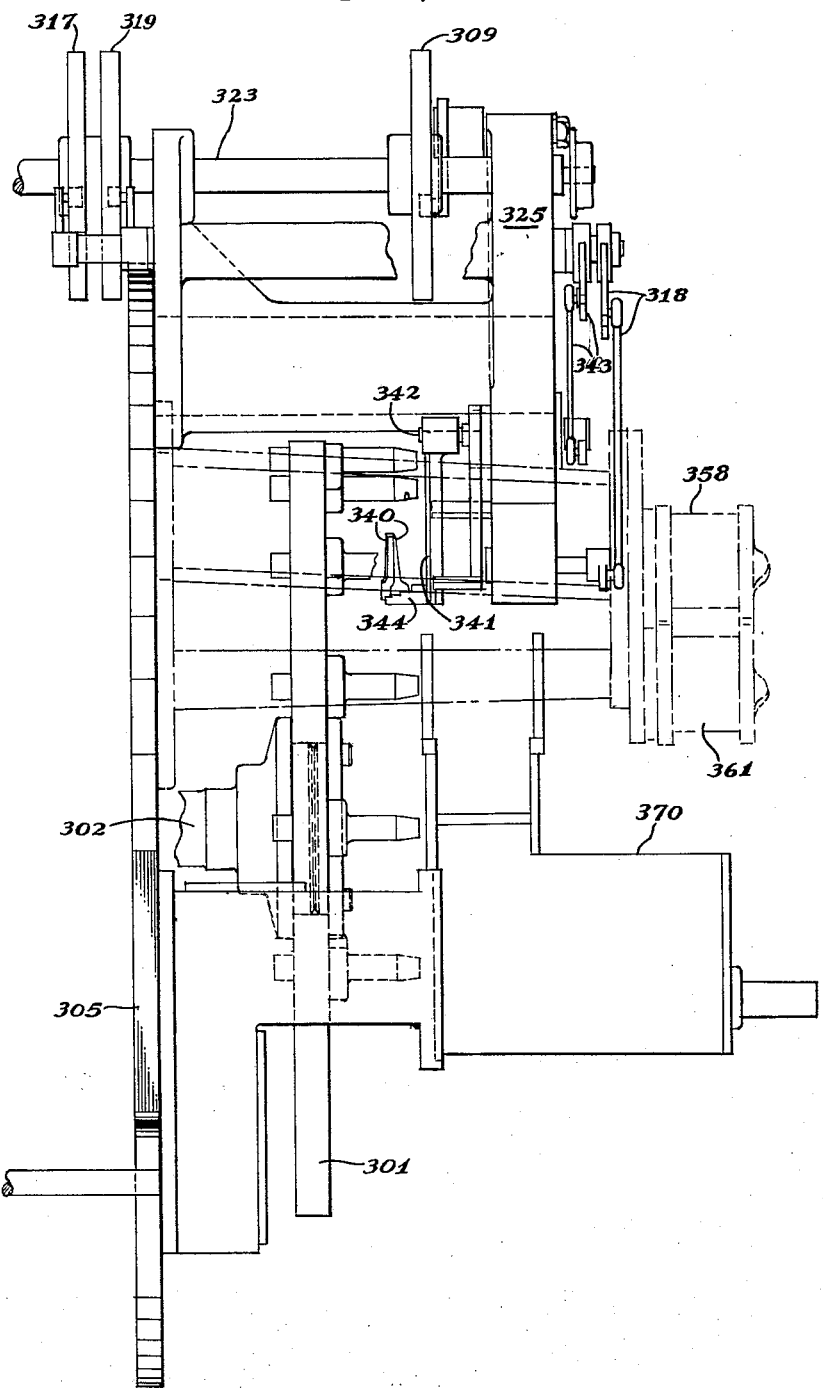
Figure 29:
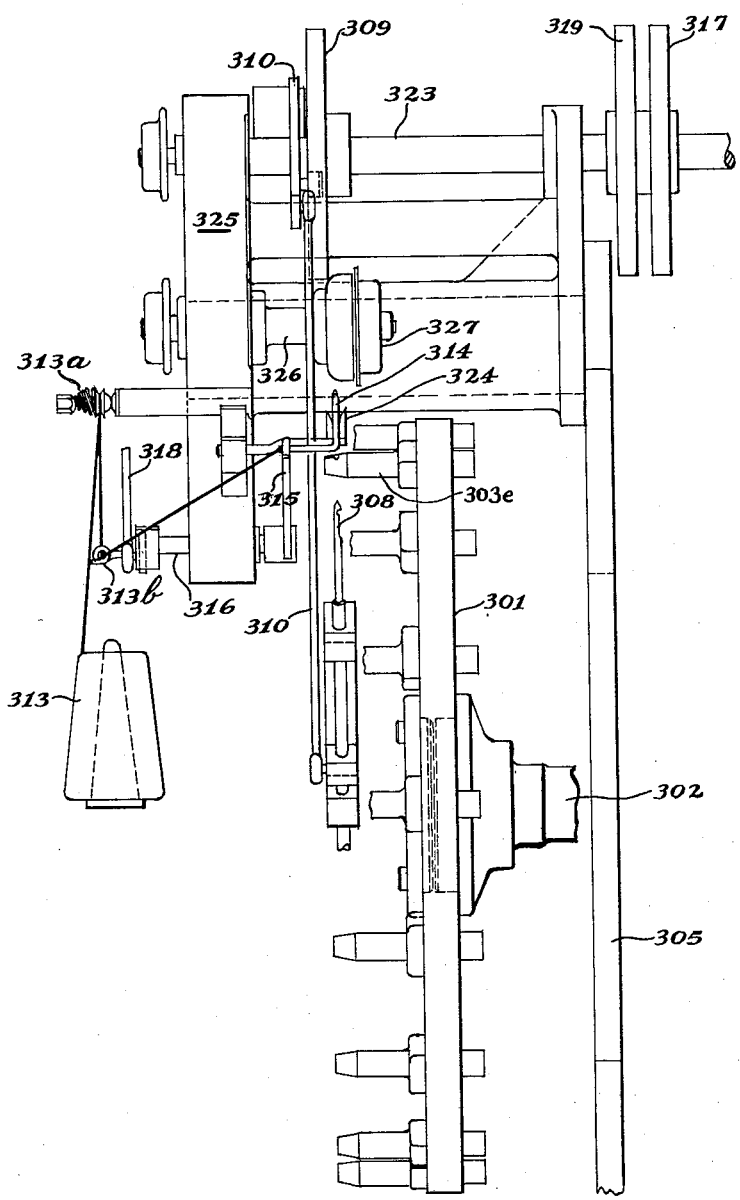
Figure 30:
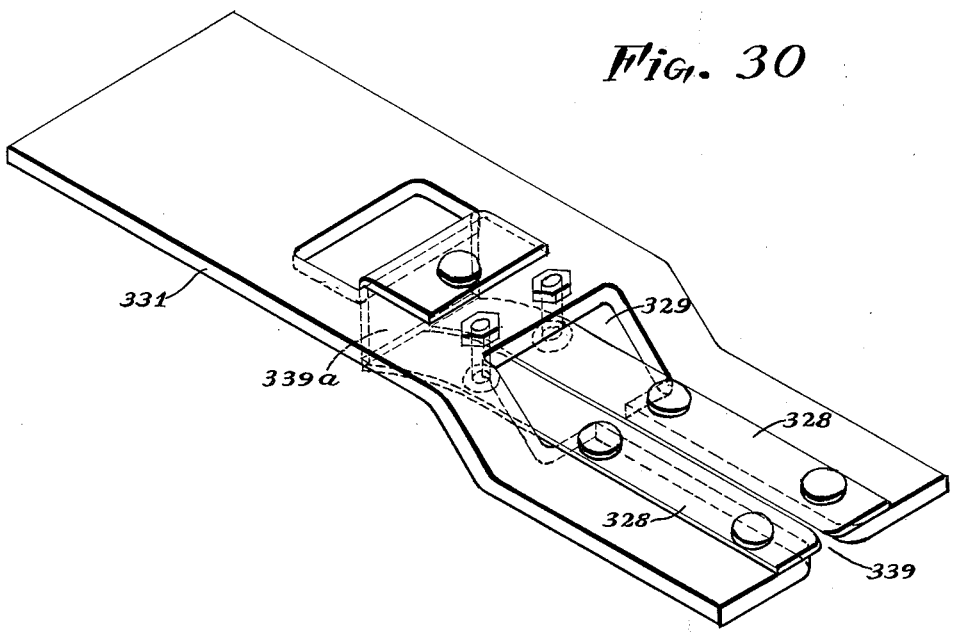
Figure 31:
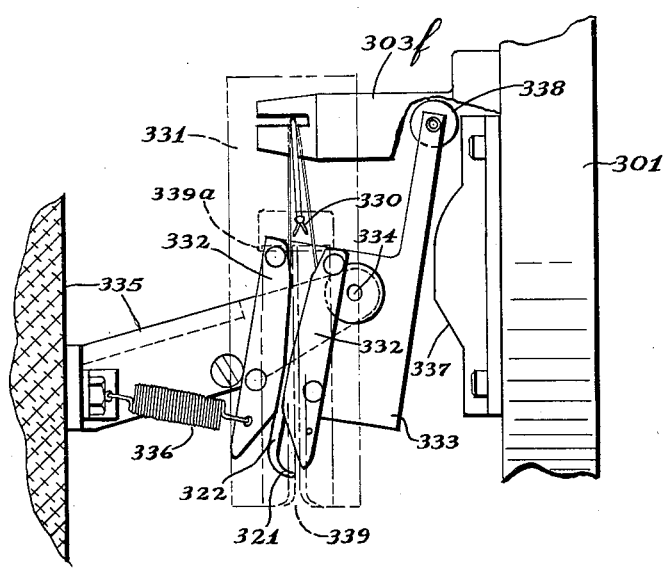
Figure 37:
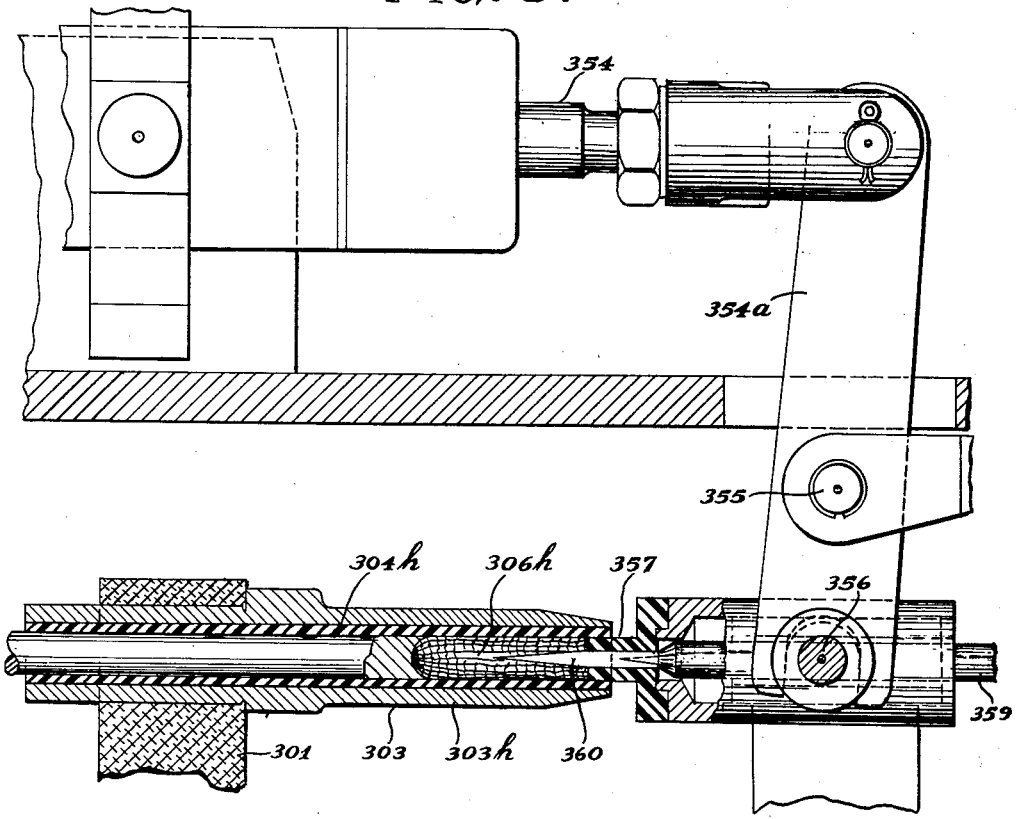
Figure 38:
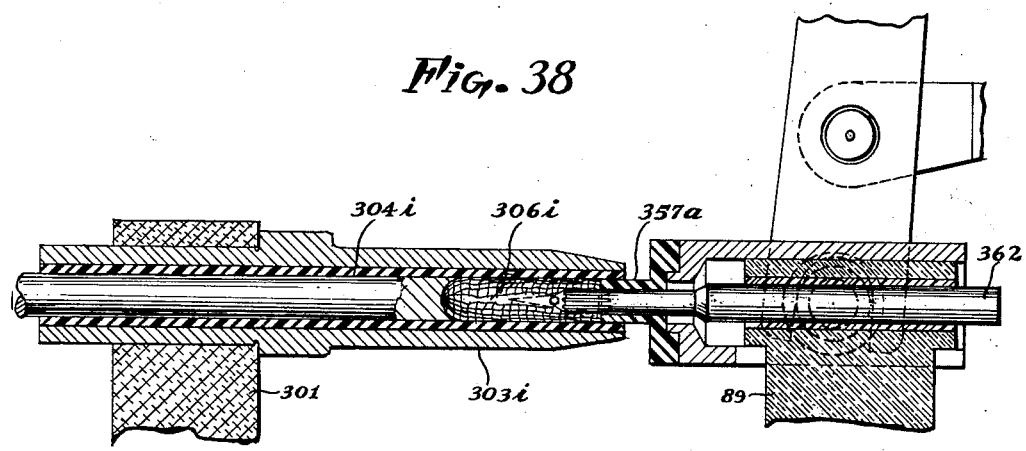
Figure 40:
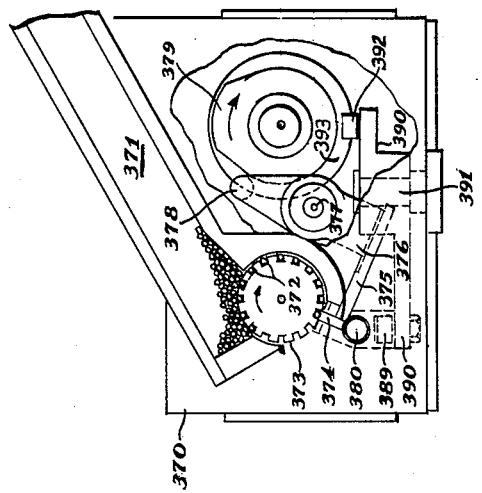
Figure 39:
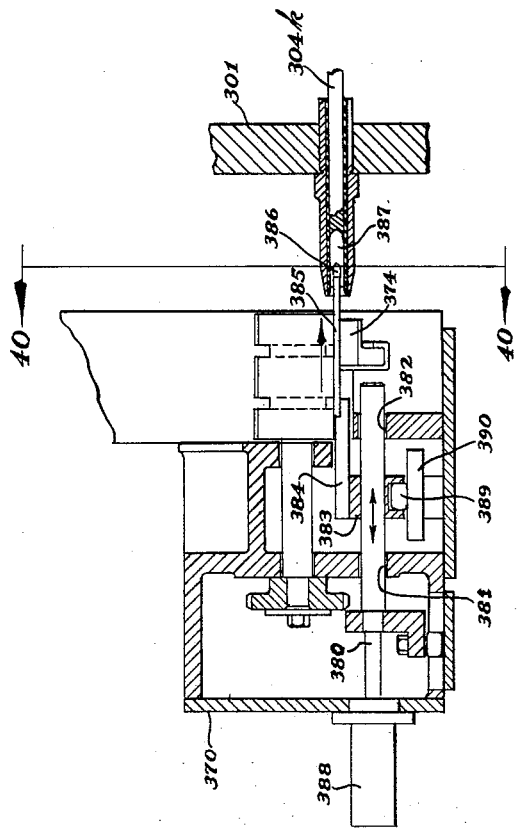
Figure 41:
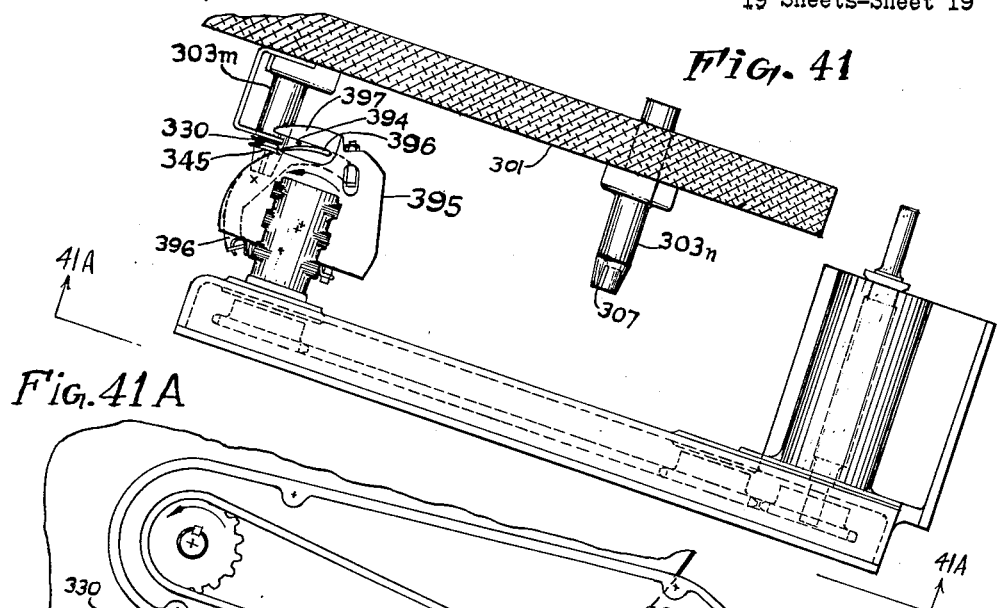
Figure 41A:
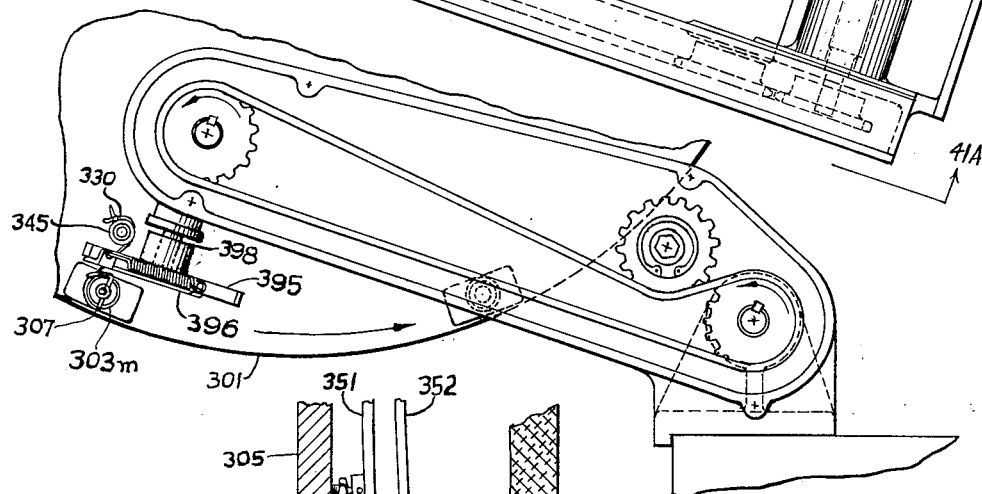

FIGS. 6, 7 and 8 are fragmentary enlarged sections taken on lines 6—6, 7—7, and 8—8 respectively of FIG. 5;

FIGS. 9-12 illustrate an alternate form of gauze-tucking mechanism which may be used in place of that illustrated in FIG. 7;

FIGS. 13 and 14 are elevations showing the front sides of a pair of precompressor dies in the open and closed positions;

FIGS. 15 and 16 are rear perspective views of the same, at smaller scale;

FIG. 17 is an elevation showing the endgate mechanisms in their relative positions on the precompressor turret;

FIGS. 18 and 19 are, respectively, a fragmentary front elevation of parts of the precompressor turret, and a side elevation of portions of this turret, taken along line 19—19 of FIG. 18;

FIGS. 20 and 21 are front elevations of portions of the compressor turret;

FIG. 22 is a detached view, at enlarged scale, of one of the units shown in FIGS. 20 and 21;

FIGS. 23, 24, 25 and 26 are fragmentary sections taken on lines 23—23, 24—24, 25—25 and 26—26 of FIG. 20;

FIG. 27 is a front elevation of the finishing assembly, certain parts being omitted and others indicated in dot and dash lines to avoid confusion of lines;

FIGS. 28 and 29 are, respectively, left and right elevations of the finishing assembly, each view omitting some parts shown in FIG. 27 and showing other parts not shown in FIG. 27, to avoid confusion of lines;

FIG. 30 is a perspective of the string plate used on the finishing assembly;

FIG. 31 is a plan view of the floating fid mechanism used on the finishing assembly;

FIGS. 32 and 33 are fragmentary sections taken on lines 32—32 and 33—33 of FIG. 27;

FIG. 34 is a section taken on line 34—34 of FIG. 32;

FIG. 35 is a section taken on line 35—35 of FIG. 34;

FIG. 36 is a section taken on line 36—36 of FIG. 33;

FIGS. 37 and 38 are enlarged fragmentary portions of FIGS. 32 and 33 respectively;

FIG. 39 is a sectional view of the stick inserter, taken on line 39—39 of FIG. 27 and slightly enlarged;

FIG. 40 is an elevation taken on line 40—40 of FIG. 39, but omitting the parts intersected by that line, portions of the front cover being omitted or broken away;

FIG. 41 is a fragmentary section at enlarged scale taken approximately on line 41—41 of FIG. 27, showing the cord tightening and releasing mechanism omitted from FIG. 27;

FIG. 41A is a fragmentary view taken on line 41A—41A of FIG. 41; and

Figure 42:
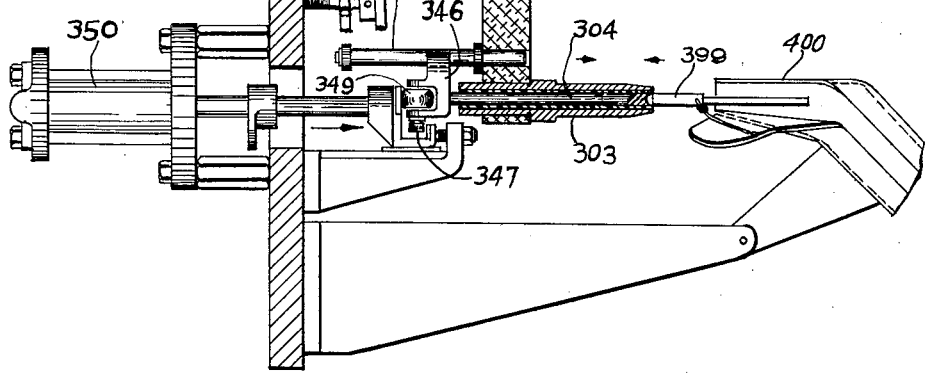

FIG. 42 is a section on line 42—42 of FIG. 27, at enlarged scale, showing mechanism omitted from FIGS. 27 to 29 for ejecting the finished tampon.

In the above figures, the symbols used in the sections to indicate the preferred materials are exemplified in FIGS. 6 and 38, in which the parts 70 and 301 are aluminum alloy, parts 80 and 303i are cast iron or steel, parts 76 and 357a are plastic (nylon preferred), part 88 is rubber, and part 89 is brass.

The Process

The process according to the present invention is illustrated in FIGS. 2A to 2K inclusive. As illustrated by FIG. 2A, a pair of uncompressed, elongate batts $a$, $b$ of suitable absorbent material, preferably a mixture of absorbent fibrous materials including resilient fibers such as described in the patent to Bletzinger, No. 2,761,449, is first stacked. As illustrated by FIG. 2B, the stacked batts are enclosed in a pervious wrapper, preferably of gauze, in the form of a sheet wrapped around the lateral sides of the stacked batts with the sides of the sheet overlapping on top of the stack to form a tube the ends of which extend beyond both ends of the batts, as illustrated at $d$, $d$. The tubular extensions $d$—$d$ are then crimped inwardly and tucked between the batts at each end, as illustrated at $e$ in FIG. 2C, thereby providing an uncompressed pledget 69 of fibrous material completely enclosed in a wrapper of gauze or the like, and of elongate, rectangular parallelepiped configuration, having a length L, a width W, and a height H.

The pledget thus formed is compressed transversely simultaneously in width and height so as to reduce it to a width $W_1$ greater than the width $W_4$ of the finished tampon and to a height $H_1$ less than the height $H_4$ of the finished tampon, as illustrated in FIG. 2D. Then, while holding the pledget thus compressed transversely, it is compressed longitudinally to a length $L_1$ substantially less than that of the length of a finished tampon, this step being illustrated by FIG. 2E. The pledget is then released, preferably longitudinally, to freedom from all compression, thereby producing a precompressed pledget or blank 142 as illustrated in FIG. 2F which re-expands principally longitudinally but also in width and height to dimensions $L_2$, $W_2$, and $H_2$, the width $W_2$ and the height $H_2$ being respectively greater and smaller than the corresponding width and height of the finished tampon, and the length $L_2$ being approximately that of the length of the finished tampon.

The precompressed tampon of FIG. 2F is next compressed transversely in the direction of its width and simultaneously shaped transversely approximately to the cylindrical shape of the finished tampon. At the same time, while one of its ends $f$ is held against longitudinal expansion, the other end $g$ is left free to expand longitudinally. While under this compression in width the pledget is allowed to re-expand in height to almost the full height of a finished tampon. Because one end of the tampon is left free to expand during its reduction in width, there is some longitudinal flow of the fibers toward the free end, and because of the compressive forces applied against the narrow sides of the pledget, with resulting maximum friction against these sides, the greatest longitudinal flow of fibers occurs along the longitudinal center, and the free end is extruded outwardly slightly into a partially rounded tip or nose, as best shown at $g$ in the upper view of FIG. 2G, which is a top plan view. Thus, there is produced, as illustrated in FIG. 2G, a compressed blank having approximately the transverse cross sectional configuration of the finished cylindrical tampon, with a width $W_3$ and a height $H_3$ approximately the same as, but slightly smaller than, that of the finished tampon, and a length $L_3$ slightly greater than the length of the finished tampon.

After the above steps the blank illustrated in FIG. 2G is compressed longitudinally and its end $g$ simultaneously shaped or nosed to the approximately hemispherical configuration $h$ of the finished tampon. This nosing operation may be performed either before or after the insertion of a withdrawal cord as next described.

While holding the compressed blank against transverse re-expansion, and either before or after the nosing compression described above, a withdrawal cord is passed transversely through the compressed blank in the direction of the original vertical height H, which is the same as the direction of the subsequent heights $H_1$, $H_2$ and $H_3$. It is unnecessary to preform a hole in the compressed blank as a separate preparatory step before passing the string through it. Preferably, in a single step a hooked needle is pushed through the properly supported and oriented blank to hook a length of cord disposed on the far side of the tampon, and the cord is quickly pulled back through the tampon. Thus, a passageway for the string is formed incidentally to the step of passing the cord through the tampon, and the tampon closes the passageway immediately to frictionally engage the cord. A loop of cord is thus passed through the compressed blank. The ends of the cord are then passed through this loop to form a knot, as illustrated in FIGS. 2H, 2I, and 2J, which are, respectively, a bottom view, a rear end view, and a view from the side which is at the top of FIG. 2H. The cord is passed through the compressed blank above the longitudinal center line as viewed in FIG. 2H, to leave room for the formation of a longitudinal recess $i$.

While holding the compressed blank against transverse or longitudinal re-expansion, a longitudinal recess $i$ is next formed in the end of the compressed blank opposite the hemispherical end $h$, that is, in the end adjacent the end in which the withdrawal cord is positioned. Preferably, this is done by two successive forming operations to shape the hole to the desired configuration. If desired, this step may be combined with the nosing operation described above.

An inserter stick $k$ is next inserted into recess $i$ to complete the formation of the finished tampon illustrated in FIG. 2K, which, before release, has the dimensions illustrated in FIGS. 2H and in 2I of $L_4$, $W_4$ and $H_4$. After release from constraint, the tampon re-expands somewhat in all directions, and then substantially maintains its size and shape under normal storage conditions.

Although the dimensions at the several stages may vary, the following are typical dimensions of the product at the several stages according to the above process, utilizing about 2.8 grams of batt material such as disclosed in the patent to Bletzinger, No. 2,761,449:

|  | Length (inches) | Width (inches) | Height (inches) |
| --- | --- | --- | --- |
| Stacked batts (Fig. 2A) | 4 | 1¼ | 1 |
| Gauze-enclosed pledget (Fig. 2C) | 4 | 1¼ | 1 |
| Under first transverse compression (Fig. 2D) | 4 | 13/16 | ⅜ |
| Under first longitudinal compression (Fig. 2E) | ⅞ | 13/16 | ⅜ |
| Precompressed blank a few minutes after release (Fig. 2F) | 1⅝ | ⅞ | 13/32 |
| After second transverse compression (Fig. 2G) | 1⅞ | 7/16(−) | 7/16 |
| Under final shaping compression (Figs. 2H and 2I) | 1¼ | 7/16 | 7/16 |
| Finished tampon after release | 1 11/16 | 15/32 | 15/32 |

The surface lines on FIGS. 2D to 2K indicate fine surface wrinkles formed on the product by the successive steps of the process. In the first transverse compression numerous fine longitudinal wrinkles are formed, as indicated in FIG. 2D. Then transverse wrinkles are formed by the first longitudinal compression, as shown in FIGS. 2E and 2F. The next compression is again transverse, and it leaves very fine longitudinal and transverse wrinkles, with longitudinal fiber flow along the vertical central plane, i.e. along the top as viewed in the upper right view of FIG. 2G. The final shaping compression is longitudinal and compacts the many fine longitudinal and transverse wrinkles into a smooth firm surface.

It has been discovered that the direction in which the withdrawal cord is passed through the tampon is important for ease and reliability in the performance of this operation. It should be passed through the compressed tampon in a direction perpendicular to the original separation plane between the stacked batts, i.e. perpendicular to the direction of the final transverse compression. Otherwise the needle which is passed through the tampon to pull the cord back through is apt to be bent. The reason for this appears to be due at least in part to a fiber arrangement which has wedge-shaped appearance as seen from the top and bottom, as indicated by the wrinkle lines in the upper right or top plan view of FIG. 2G. This fiber arrangement results from the fiber flow during the second transverse compression described above.

By making tampons by this process it is found that it is easier to insert the withdrawal cord and easier to form the hole for the inserter stick. Contrary to what might be expected, the formation of this hole does not cause undesirable local overcompression of the tampon around the stick hole. Upon being wetted under no restraint the tampon re-expands in all directions in a uniform manner to the proportions of the precompressed pledget, filling up the inserter stick hole. In use, the tampon quickly expands to fit the vaginal cavity comfortably, and it gives security to the user against leakage, up to the absorptive capacity of the material.

This process also facilitates production in automatic machinery at a higher rate than possible heretofore. Various forms of apparatus may be used to practice the process, the apparatus described below being preferred.

*Apparatus*

Figure 1:
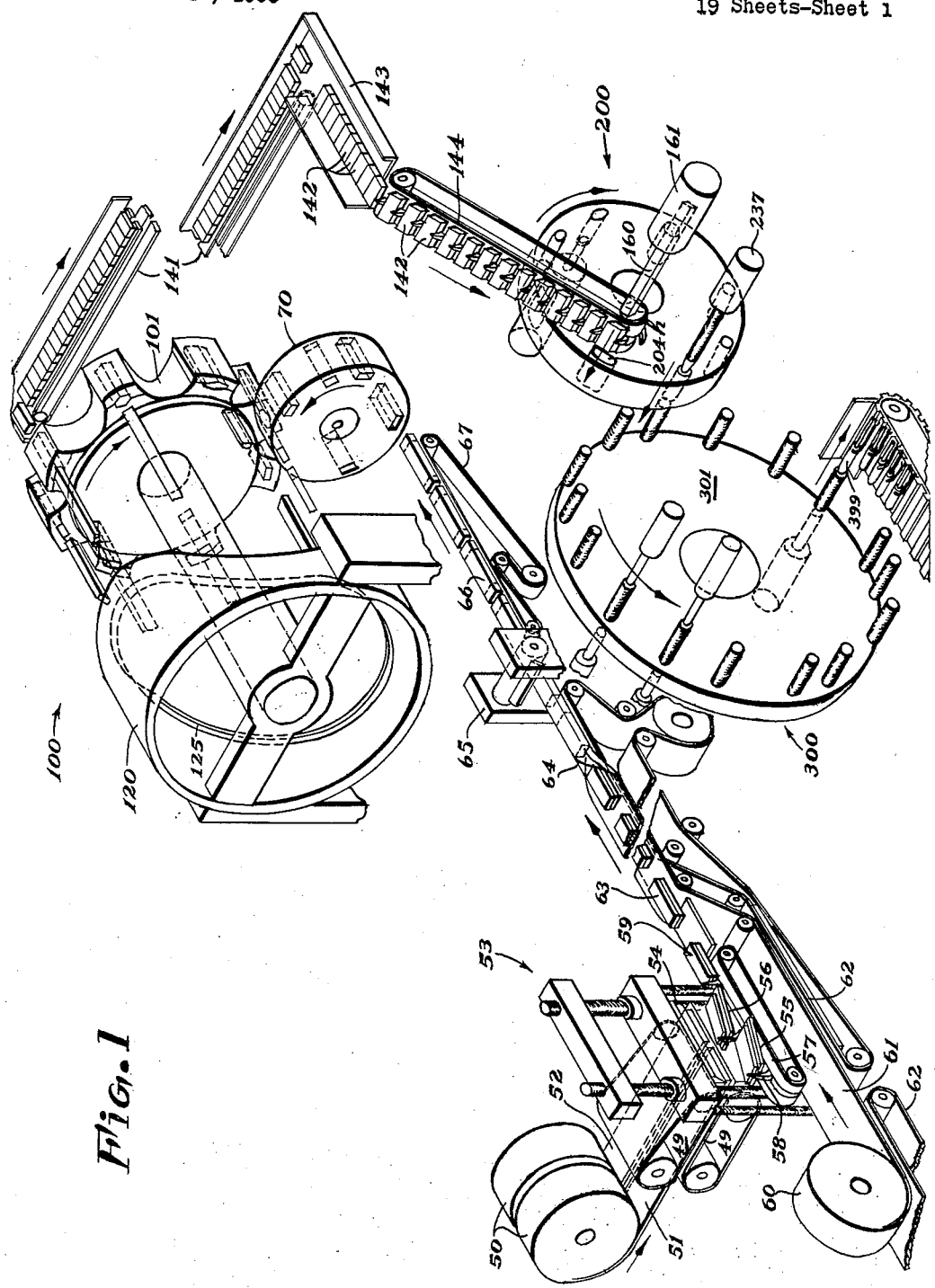
FIG. 1 is a schematic drawing in perspective of preferred apparatus in accordance with the invention.

Preferred apparatus in accordance with the present invention is arranged as illustrated schematically in FIG. 1.

*Pledget Forming*

Referring to FIGS. 1, 3 and 4, from a supply of batt material indicated at 50 two strips of uncompressed batt material each approximately 4 inches wide and one-half inch thick, indicated at 51 and 52, are fed in side-by-side relationship by upper and lower feed belts 49 to a cutter and stacking mechanism indicated generally at 53. The batt feed mechanism advances the strips of batt material intermittently about 1¼ inches at a time, then stops the strips, at which time a reciprocating cutter 54 cuts off two sections of the batt material which fall on respective inclined ledges 55 and 56. These ledges are slotted to permit the passage therethrough of fingers 58 carried by an endless chain 57 moving under the ledges transversely to the direction of movement of the batt strips 51 and 52. Chain 57 and fingers 58 move continuously at a speed relative to the movement of strips 51 and 52 and to the cutting action of cutter 54, such as to immediately move under ledge 56 each batt section which has fallen on 55, and at the same time move the batt section which has fallen on ledge 56 off this ledge. The result is that, at each step when the cutter shears off two batt sections the batt section previously dropped upon ledge 55 has been moved under the batt section dropped upon ledge 56, and on the next step these two sections are moved together beyond ledge 56 in perfectly stacked arrangement as indicated at 59. Thus, there is produced a steadily moving array of pairs of stacked batts which are spaced about two inches.

From a roll 60, a strip of gauze 61 about 5 inches wide is fed by belts indicated generally at 62 under the advancing array of stacked batts and then upwardly to their level. The batts are fed onto the continuously advancing gauze at 63 and then carried along by the gauze strip to 64 where folding plows raise first one edge of the gauze strip and lay it over the batt material, and then raise the other edge of the gauze and lay it over the batt material so as to overlap the first fold. From point 64, there is then a gauze tube enclosing spaced pairs of batts. This tube passes through a rotary cutter 65 where the gauze is cut between batts to provide a succession of spaced pairs of superimposed batts or batt sections, each enclosed in a tubularly arranged section of gauze. Each such unit 66 thus comprises an uncompressed mass of fibers in the shape of a rectangular parallelepiped about 4 inches long, 1¼ inches wide, and 1 inch high enclosed in a gauze tube which extends about 1 inch beyond each end. One of these units, which may be termed an "untucked pledget," is shown in FIG. 2B and is explained above in the description of the process according to the present invention.

The untucked pledgets 66 are moved along continuously by suitable belt conveyor mechanism indicated at 67 to a tucker turret indicated at 70 and illustrated in FIGS. 5 to 8 inclusive. In FIG. 5 certain parts are omitted to avoid confusion of lines.

*Tucker*

Referring to FIG. 5, tucker turret 70 is mounted for rotation on a horizontal shaft 77 and is driven in intermittent or step-by-step motion in a counterclockwise direction and in timed relation to delivery belt conveyor 67, and to the step-by-step or intermittent rotary motion of precompressor turret 100, which is geared to turret 70 and rotates in a clockwise direction. Tucker turret 70 has 6 pockets or pledget holders 71 to 76 inclusive arranged around its perimeter. These holders extend through tucker turret 70 parallel to axis 77 and have cavities which are open at both ends and have a shape to receive and hold the untucked pledgets 66. Turret 70 is indexed one step at a time so that each holder successively occupies each of the 6 stations. In the position illustrated in FIG. 5, the turret has been indexed so that holder 76 is in position to receive an untucked pledget from conveyor 67, the pledget in the holder 74 is in position to have the gauze tucked into its ends, and the one in holder 72 is in position to be transferred to the precompressor turret 100.

FIG. 6 shows a fragmentary cross section of tucker turret 70 at the station illustrated near the bottom of FIG. 5 at which the untucked pledget 66 is transferred from the belt conveyor indicated at 67 into the holder 76. Each of the holders is slidably mounted for axial movement, and as illustrated in FIG. 7 is spring biased to the right, so as to bring a follower 78 carried by it up against the surface of a positioning cam 79 (FIGS. 5 and 7) which is mounted for oscillation on shaft 77 (FIG. 5). Thus, the holders 71 to 76 are spring biased to the right as viewed in FIGS. 6, 7 and 8, and their right to left positions are individually controlled by the rotary (oscillated) position of cam 79, by means of their respective followers 78 being spring biased against said cam. In FIG. 6 holder 76 is shown in its right hand or receiving position. When the turret is indexed to this position, a suitable cam mechanism 95 and linkage 96, 97 (FIG. 5) driven by the turret drive rotates positioning cam 79 through an angle such as to allow the biasing spring to move holder 76 momentarily to the right to the position illustrated in FIG. 6 and thus bring it into contact with a suction head 80. This applies a partial vacuum to the cavity of holder 76. The suction thereby created within holder 76 quickly sucks the untucked pledget 66 from the adjacent end of the conveyor into the pocket and against the stop 80' within the suction nozzle 80. The cam mechanism then turns positioning cam back, which moves holder 76 to the left, to the position relative to turret 70 illustrated in FIG. 7.

Referring again to FIG. 5, turret 70 is then indexed two steps counterclockwise (as seen in FIG. 5) to the position indicated for holder 74, holder 74 being at the tucking station, details of which are shown in FIG. 7. Referring to FIG. 7, holder 74 is in the normal or left-hand position. The walls of the holders have apertures through them adjacent each end, as at 83 and 84. In the left-hand position of the holder illustrated, aperture 83 is clear of turret 70 and aperture 84 is aligned with an aperture 86 in turret 70. Preferably, there are at least two apertures adjacent each end through the holder to the atmosphere. Spaced from each end of holder 74 at the illustrated station are a pair of nozzles 81 and 82, one at each end. These nozzles have flat, thin orifices which are aligned with the holder 74 so as to be coplanar with the plane of separation between the two batt sections of untucked pledget 66. A short pulse of high velocity air from a source of compressed air is directed from nozzles 81 and 82 simultaneously inwardly upon the division line between the two batt sections. Pressure immediately around this stream of high velocity air is of course reduced, causing collapse of the extending tubular gauze portions 68—68 inwardly around the respective ends of the batts. The stream of air then catches these ends, forcing them in between the batt sections to form a pledget 69 like that illustrated in FIG. 2C. The tucking operation represented in FIG. 7 by the change from the broken line positions of gauze 68 to the full line position of pledget 69 is very rapid, taking a fraction of a second.

The method of tucking described above is disclosed and claimed in the copending application by Carl H. Rowe filed concurrently herewith. Other tucking methods and tools may be used in apparatus according to the present invention, for example that described below in connection with FIGS. 9 to 12.

Referring again to FIG. 5, turret 70 next indexes two more steps counterclockwise, at which point the holder containing the pledget is in the position indicated at 72. At this point the pledget is transferred to the precompressor turret 101, as illustrated in FIG. 8. In this position, the holder 72 is moved momentarily to the right to position shown in FIG. 8, in registry with the precompressor die chamber 116 of the adjacent die assembly 103c. This is done by the cam means referred to above in connection with the explanation of FIG. 6. At the same time, a suction head 90 having a stop 91 is reciprocated (by automatic means not shown) to the left momentarily from the broken-line position shown to the full-line position indicated, with a rubber sealing ring 92 contacting the adjacent dies of die chamber 103c. Holder 72 being very close to the opposite end of this die chamber's die space, suction is thus applied to the chamber of the die space, creating a partial vacuum in this chamber so that pledget 69 is quickly sucked into the die chamber. In FIG. 8 pledget 69 is shown in both positions, i.e. before and after transfer. It will be noted that, after transfer, pledget 69 appears thinner, as viewed in FIG. 8, than it was before transfer. The transverse shape of chamber 116 at this point is best shown in FIG. 13, which is the fully opened position (transversely). As shown, chamber 116 in this position is approximately hexagonal in cross section, and it has an average height (along a radius from center 106) which is somewhat smaller than the corresponding dimension of the chamber in holder 72 (as shown in FIG. 8) and an average width (FIG. 13) which is slightly greater than the corresponding dimension of chamber 72. The entrance edges of chamber 116 are rounded at 141 (FIG. 13). As the pledget is transferred it is slightly compressed transversely and it is squeezed into and fills chamber 116. The pledget having been transferred, the empty holder 72 is then moved to the left by the cam mechanism 79, 95, 96 described above, to the normal left-hand position indicated in FIG. 7, and suction head 90 is also moved to the right to the broken-line position, so that precompressor turret 101 is ready to be indexed one step clockwise (as seen in FIG. 5), as described below.

Figure 9:
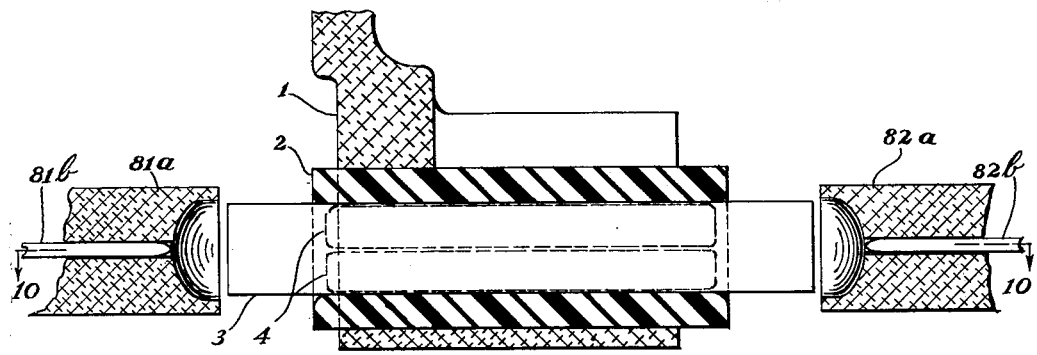
Figure 10:
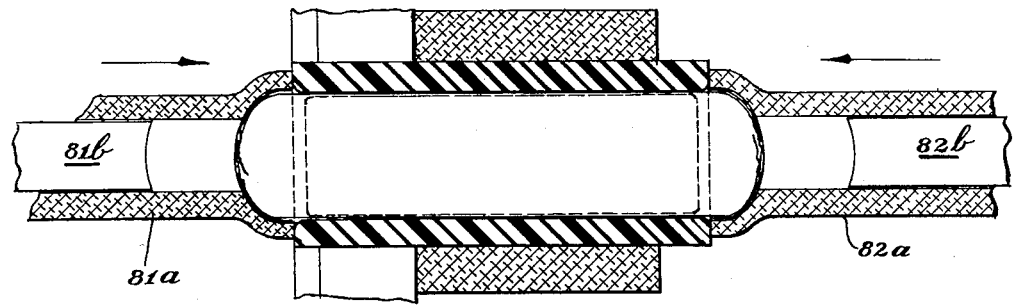
Figure 11:
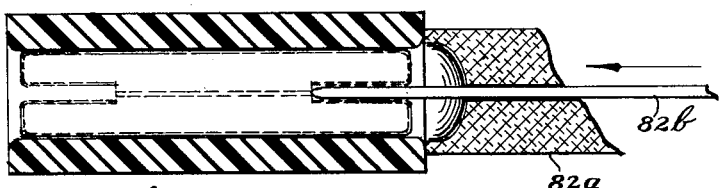
Figure 12:
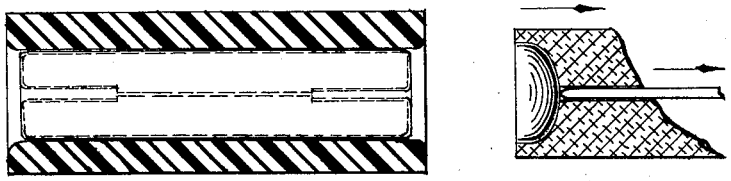

As mentioned above, other methods and means may be used for tucking the ends of the gauze into the ends of the pledget. The means illustrated in FIGS. 9 to 12 is illustrative. FIGS. 9, 11 and 12 are radial sections, and may be used at the station illustrated in FIG. 7. A pair of cup-shaped gathering tools 81a and 82a are advanced toward opposite ends of the pledget and gather the tubular extensions inwardly as illustrated in FIG. 10. Then flat tucking blades 81b and 82b are advanced into the pledget between the pair of batt sections, as illustrated in FIG. 11 (only the right-hand tools 82a and 82b are shown in this figure), to tuck the gauze between the batts. The tools are then withdrawn as indicated in FIG. 12 (the left-hand tools being omitted in this figure), and the turret is ready for indexing for the succeeding cycle.

Precompressor Assembly

Referring to FIG. 5, numeral 101 indicates generally the transverse compression means of precompressor assembly 100 comprising a turret mounted for rotation about a horizontal axis 102 parallel to the axis 77 of the tucker turret 70. Mounted on the perimeter of turret 101 are 8 precompressor die assemblies designated 103a to 103h inclusive. Each of these assemblies includes a die mechanism for compressing a pledget transversely in two directions simultaneously to reduce it from the form shown in FIG. 2C to that shown in FIG. 2D of the process drawings. Detached views of a pair of the dies are shown in FIGS. 13 and 14, and in FIGS. 15 and 16. FIGS. 13 and 14 show a pair of these dies at full scale from the front, i.e. from the same side as seen in FIG. 5, FIG. 13 showing them in their open position and FIG. 14 in their closed position. FIGS. 15 and 16 are corresponding views in perspective from the opposite or rear side of the turret, to smaller scale. Each die assembly comprises a fixed die 104 and a coacting rotary or pivoted die 105 mounted for rotation about a pivot axis 106. Rigidly secured to each pivoted die 105, as shown in broken lines in FIG. 5, is a follower arm 107 having at its end a follower 108 which rides in a cam slot 109 in fixed structure.

Referring to FIG. 13, each of the compressor dies has coacting surfaces 131 to 134 and 136 to 139 inclusive, all of which extend longitudinally parallel to the axis 102 of the precompressor turret and to the axis 106 of pivoted die 105. Of these surfaces, fixed die 104 has inner flat side surfaces 131 and 132 at right angles to each other and corresponding to one side and the top of the pledget after it has been precompressed transversely, an outer cylindrical surface 137 extending from the edge of surface 132 opposite that of surface 131 in a direction away from the die chamber 116, and an inner cylindrical surface 136 extending from the lower edge of surface 131 and away from the die chamber 116. "Outer" and "inner" here indicate relative distances from pivot axis 106. Pivoted die 105 has flat side and bottom surfaces 133 and 134 at right angles to each other, corresponding to the opposite side and bottom surfaces of the pledget after it has been compressed, an outer cylindrical surface 139 extending from the upper edge of surface 133 and away from chamber 116, and an inner cylindrical surface 138 extending from the edge of surface 134 opposite surface 133 and away from chamber 116. Cylindrical surfaces 136, 137, 138 and 139 are all centered on the axis 106. Surfaces 137 and coating surface 139 are spaced apart by a clearance of between .002" and .006", as indicated but exaggerated in the drawings, and coacting surfaces 136 and 138 are similarly spaced apart. These pairs of coacting cylindrical surfaces thus do not touch each other but are so close together that they provide an effective seal for the product around the lateral sides of the chamber 116. In FIG. 5, a precompressor die assembly is illustrated in its closed position at the top at station 103h and another is shown in its open position at adjacent station 103a. The entrance edges all around each chamber in its open position are rounded at 141 in FIGS. 13 and 14 to facilitate transfer of the pledget into the die chamber. Referring to the closed position of the precompressor die as illustrated in FIG. 14 and at station H, for example, it will be noted that the transverse rectangle of the closed die chamber is tilted at an angle to the plane through the center of the chamber and axis 106 of the pivoted die, with the edges 130 and 140 of the jaws (the jaws formed respectively by surfaces 131—132 on one hand and by surfaces 133—134 on the other hand) not overlapped but spaced well apart across radial plane 145. It will also be noted that the difference in the distance from pivot 106 to cylindrical surface 137 is greater than the distance from pivot 106 to surface 138 by a difference which is substantially greater than the length of the short sides 131 and 133 of the rectangle. This arrangement makes the chamber 116 in the open position much larger than it would otherwise be, and makes possible the rapid, simultaneous transverse compression of the pledget from the rectangular cross section illustrated in FIG. 2C of the drawings to that of FIG. 2D. In the open position of the precompressor dies illustrated in FIG. 13 and at 103b in FIG. 5 it will be noted that the transverse cross section is hexagonal in shape, two surfaces of the chamber being formed by cylindrical surfaces 137 and 138. In its open position the die has a maximum width of about 1⅝ inches from corner to corner and a maximum height of about 11/16 inch. This cross sectional height is slightly smaller than that of the uncompressed pledget 69 before it is sucked into chamber 116 by vacuum head 90 as illustrated in FIG. 8 and described above. Thus, pledget 69 is squeezed as it is drawn into chamber 116.

Referring again to FIG. 5, as explained above, precompressor assembly 100 with its turret 101 rotates clockwise in step-by-step fashion, being indexed successively at each of the eight stations A to H corresponding to the die assemblies 104a to 104h, inclusive. At each of these stations in FIG. 5, the several corresponding parts of each assembly are identified in the following description by the same numbers 103 to 108, respectively, and all parts at each station, except station A, may be identified by an added small letter corresponding to the large station letter so that, for example, at station B, each of these parts has the small letter "b" added after the numeral designating the particular part. Considering the die mount at station B, it will be noted that cam 109 has placed follower 108b in position to open pivoted die 105b fully. The pivotal die remains fully open until after it passes station C, which is the transfer station illustrated in FIG. 8 and described above. As the turret is indexed clockwise to station D, the follower at position 108d moves pivoted die 105 to the fully closed positions illustrated at stations D through H. Thus, the pledget is compressed transversely and simultaneously in two directions, to the shape shown in FIG. 2D.

FIG. 17 is a view similar to FIG. 5, showing the means on turret 101 for operating the end gates 110 for closing the far ends of precompression chambers 116, that is, the right-hand ends as viewed in FIG. 8. Projected onto FIG. 17 are dot and dash lines showing the precompressor die mounts exactly as in FIG. 5, but omitting the die-operating mechanisms. Thus, FIG. 17 shows the endgate actuating mechanism as seen from the same direction as in FIG. 5, and with the die mounts projected in construction lines in their proper positions to show the relationships between FIGS. 5 and 17.

Each endgate assembly, e.g. at station A, comprises a gate 110 pivotally mounted at 111 and rigidly attached to a follower arm 112 which has at its outer end a follower 113 which is guided by a cam groove 114 in a fixed cam plate 114a (FIG. 19). Cam groove 114 causes gate 110 to be opened, that is out of alignment with chamber 116 at stations A through C, the latter station being the one at which the pledget is received from the tucker turret. A turret 101 indexes step-by-step in clockwise direction toward station E, cam 114 actuates gate 110 to close the same, it being in the fully closed position from station E through station G and almost to the station H at the top. As the indexing turret brings die mount 103h to station H, cam follower 113h is moved so as to bring gate 110h just below chamber 116, thereby bringing a platform 115h, which is integral with gate 110, into position to receive the precompressed pledget or blank as it is discharged from the precompressor turret. Thus, gate 110 provides a backup plate against which the pledget may be compressed longitudinally by means to be described below during a portion of the travel of the pledget in the turret as the latter is indexed clockwise, and a platform to receive the pledget on discharge.

Referring now to FIGS. 18 and 19, FIG. 18 shows a fragmentary view similar to FIGS. 5 and 17 with actuating parts omitted for clarity. FIG. 19 shows a side elevation view of the precompressor turret assembly partly sectional along line 19—19 of FIG. 18 and omitting various parts for the sake of clarity. Precompressor assembly 100 comprises, in addition to the turret 101 proper (upon which the precompressor dies, endgates, and their operating mechanisms are mounted), mechanism for compressing the pledgets longitudinally after they have been compressed transversely as described above, and while being thus held transversely. As explained above, from stations E through G, and almost to station H, endgate 110 provides a backstop on the rear of the dies, which is on the left-hand side of FIG. 19. Mounted on fixed structure to the right is a cam drum 120, the inner cylindrical surface of which has a cam groove extending all the way around it circumferentially adjacent the left-hand side thereof, which edge slants downwardly to the right from the top. (See also FIG. 1.) This cam groove is indicated at 125 for the near side and 126 for the far side. Rigidly mounted upon turret 101 and extending parallel to the axis of said turret are a plurality of guide columns 121, there being two of these guide columns extending to the right (as viewed in FIG. 19) from each precompressor die mount 103. Slidably mounted on each of these pairs of guide columns 121 is a slide 122, and each of these slides carries a plunger 123 which has a rectangular cross section to fit compression chamber 116 and is oriented and in alignment with the respective chamber 116 in its closed position, so that it comprises a longitudinal compression plunger for compressing the pledget gradually as the turret is indexed, after it has been compressed transversely. Each plunger is moved by a cam follower 124 mounted on the respective slide 122, the cam follower being guided by the cam groove 125—126. In the lowermost position of plunger 123, illustrated at 123d, cam 125 has withdrawn plunger 123d clear of tucker turret 70. This corresponds to station D at which station the pledget is being precompressed transversely. By the time the pledget has been indexed to station E, endgate 110 has been positioned as a backstop, as shown in FIG. 17, although to avoid confusion of lines, most of the endgates and their operating levers have been omitted from FIG. 19. Only the top assembly is shown, 110h to 115h, inclusive. At station E plunger 123 is in the position illustrated at 123e and is approaching chamber 116e. Just beyond station E plunger 123 enters chamber 116, and it continues to move forward as indicated at 123f and 123g, at which point the maximum longitudinal compression is attained, the compression chamber being reduced to the small size indicated at 116g, the maximum compression may be held for any period of time desired by making modifications on the cam. This reduces the pledget to the size and shape indicated in FIG. 2E and described in the explanation of the process. Gate 110 opens between stations G and H and plunger 123 is then further advanced as indicated at 123h to push the precompressed pledget or blank longitudinally out of closed chamber 116 onto platform 115h, from which it is transferred to a conveyor 141 by a short overhead pushing means 141a. Since the greatly compressed blank of FIG. 2E is released longitudinally it undergoes an immediate partial longitudinal re-expansion, and during its travel to the next portion of the processing apparatus (see FIG. 1) it re-expands slightly in all directions to a blank 142 of the shape and size illustrated in FIG. 2F and explained above in the description of the process.

The original batt sections a and b (FIG. 2A) of which compressed blank 142 is formed maintain their orientation and longitudinally by the steps of compression. This orientation is important for the operation of inserting the withdrawal string through the compressed tampon perpendicularly to the original plane of separation in the process step illustrated by FIGS. 2H and 2I, and the orientation is maintained throughout the apparatus, although there is no objection to turning the blank end for end or upside down after it leaves the precompressor turret assembly 100.

Referring to FIG. 1, conveyor 141 moves compressed blanks 142 via an inspection station 143 at which by hand, or by automatic means not shown, the blanks are fed sideways to a feeding conveyor 144 which advances step-by-step in synchronism with compressor turret assembly 200 which rotates clockwise as illustrated in FIG. 1 in intermittent, step-by-step motion. At the foot of conveyor 144 is a transfer station best shown in FIG. 21, which is at the station H' or 203h in FIG. 20.

*Compressor Assembly*

The compressor assembly generally designated 200 in FIG. 1 is shown in FIGS. 21 to 26 inclusive. As illustrated in FIG. 20, turret 201 is mounted for rotation about a horizontal axis 202 and has mounted on its periphery a plurality of compressor and endgate assemblies, each of which is generally designated 203. An enlarged detached view of one of these assemblies is shown in FIG. 22. To avoid confusion of lines, the endgate assemblies and their actuating mechanisms are omitted from FIG. 20 and shown seperately in FIG. 21 superimposed upon dot and dash lines showing the outlines of FIG. 20.

Referring to FIG. 22, each compressor assembly 203 comprises a rigidly mounted fixed die 205 and a pivotally mounted die 206 pivoted to the mount at 207 for rotation about a horizontal axis which is parallel to the axis 202 of the turret. Rigidly fixed to pivoted die 206 is a follower arm 208 having at its outer extremity a follower 209. Also pivotally mounted on the compressor assembly at 211 for rotation about a horizontal axis in an endgate 210 with rigidly attached follower arm 212 having at its outer extremity a follower 213.

Referring to FIG. 24, the endgates and their connected followers are mounted on the right-hand side, which is the side from which the blanks 142 are inserted, the endgate at this particular station being designated 210g, its pivot 211g, its follower arm 212g and its follower 213g. The followers ride in a cam groove 214 mounted on fixed structure, and this cam governs the opening and closing of endgates 210 as shown in FIG. 21.

The pivoted die mounting at station G' is indicated at 206g, its pivot at 207g, its follower arm at 208g. The follower 209g rides in a cam groove 215 in fixed structure. As shown in FIG. 20, cam groove 215 acts on the followers of the several pivoted dies in controlling the opening and closing of the latter.

Referring to FIG. 22 it will be seen that fixed die 205 has a concave, approximately semi-cylindrical pressure face or jaw 216, an outer cylindrical surface 217 above die chamber 204, and an inner cylindrical surface 218 extending away from the chamber from the lower face of the compression surface 216 at edge 222. Pivoted die member 206 has a concave, approximately semi-cylindrical pressure surface or jaw 219, an outer cylindrical surface 221 extending away from chamber 204 from the upper edge 223 of compression surface 219, and a lower cylindrical surface 220 extending under chamber 204 away from the lower end of compression surface 219. Cylindrical surfaces 217, 218, 220 and 221 are centered on the axis 207 of pivoted die 206. Outer cylindrical surfaces 217 and 221 do not touch but are separated by a clearance of about .002" to about .006". Similarly, cylindrical surfaces 218 and 220 are slightly spaced apart by the same clearance. These clearances are exaggerated 219 is advanced to the extreme position indicated at 219', so that a blank introduced into chamber 204 when it is fully opened, with its wide dimension or width W2 of FIG. 2F disposed across the chamber, is overcompressed somewhat beyond a cylindrical shape to a somewhat oval cross-section. The amount of this overcompression is arranged so that when the blank thus compressed is released it springs back approximately to a cylindrical configuration such as illustrated at W3 in FIG. 2G of the process drawing.

Returning now to the sequence of operations, as indicated in FIG. 1, precompressed blanks 142 are fed by conveyor 144 into position in front of a plunger 160 which pushes them in sequence into the successive die chambers as the latter are indexed to the position indicated at 204h.

Referring to FIG. 23, plunger 160 is actuated, in timed relation with the movements of turret assembly 200 and conveyor 144 by means of an air cylinder 161 (schematically indicated on the same side as 160 in FIG. 1) and connecting member 162, and pushes each blank 142 in succession into the chamber 204h of a pair of compression dies indexed at station H' of FIG. 20.

Turret 201 is next indexed clockwise (FIG. 20) one step to station G', indicated at 203g. As the turret is being indexed clockwise from station H' to station G', cam 214 moves backup or endgate 210, indicated in FIG. 21, to the position indicated at 210g, covering the end of chamber 204 into which blank 142 has just been introduced at station H'. This station is not indicated in FIG. 1 but is illustrated in cross-section in FIG. 24. When turret 201 has been indexed to this position, a plunger 225 actuated in timed relation by an air cylinder 226 presses blank 142 to the right against backup 210g. Plunger 225 is withdrawn and the turret is ready to be indexed at the next station.

Turret 201 is then indexed clockwise two stations F' and E' in succession, and during this movement of the turret cam 215 closes pivoted die 206 to the minimum size indicated at 219' in FIG. 22. During this compression the free end of blank 142, that is the end opposite backup 210, is extruded somewhat as described above in the description of the process, the blank being increased in length somewhat beyond the length of the finished tampon, and a partially formed tip or nose g (FIG. 2G) is formed by the time the tampon blank reaches station E'.

At station E' each tampon blank is subjected to a final longitudinal compression to reduce it to its finished length and to complete the shaping of the nose to the hemispherical form shown in FIGS. 2H and 2J. The means for doing this is illustrated in FIG. 25. A nosing plunger 230 powered by an air cylinder 231 compresses the blank 142 against backup or endgate 210e. Since at this station the tampon blank is overcompressed transversely beyond the cylindrical shape, as indicated at 219' in FIG. 22, plunger 230 has a traverse cross section corresponding to the minimum chamber size. The end of plunger 230 has a cup-shaped cavity of such a configuration that, when the tampon blank is released from the transverse overcompression, the tampon blank has approximately hemispherical shape indicated in FIGS. 2H and 2J. Plunger 230 is withdrawn from the position illustrated in FIG. 25, and turret 201 is ready for indexing again in a clockwise direction as illustrated in FIG. 20.

It is not essential to perform the above-described final longitudinal compression and nose forming operation in compression turret 201. If preferred, this operation may be performed in the finishing turret 300, as explained below.

Turret 201 is next indexed clockwise step by step to bring the tampon under consideration past D', C' and B' to the station A' of FIG. 20. As the turret is indexed from station B' to station A' backup 210 is moved out of the way by cam 214, as illustrated in FIG. 21, and pivoted die 206 is opened slightly by cam 215 (FIG. 20) to bring the die chamber to a cylindrical transverse cross section. At this station the mechanism illustrated in FIG. 26 operates to transfer the compressed tampon 142 from turret 201 to the finishing assembly 300. A plunger 236, actuated at the proper time by an air cylinder 237 pushes the compressed tampon blank from the die chamber of compressor turret 201 into the indexed die 303b of finishing turret 301, and up against a positioning plunger 304 of turret 301. Plunger 304 holds compressed tampon 306 in correct position for the finishing operations to be performed by the finishing assembly 300, as described below.

*The Finishing Assembly*

The finishing assembly, generally designated 300, is best shown in FIGS. 27, 28 and 29, which show respectively a front elevation, a left side view and a right side view. To avoid confusion of lines some elements are shown in only one of these figures. The mechanism shown in these views is supported by a fixed frame, which has been omitted to show the working parts more clearly, the mechanism comprising a turret 301 mounted for rotation about a horizontal axis on a main shaft 302, a plurality of axially extending dies 303 mounting around the periphery of turret 301, and a fixed tool plate 305 mounted on the main frame, upon which various tools for operating upon the tampon are mounted.

Finishing turret 301 is geared to compressor turret 201 and rotates counterclockwise step-by-step in synchronism with it, being indexed in a fixed position successively at each of the 16 stations indicated in FIG. 27. At some of these stations tools mounted on tool plate 305 operate upon the respective tampon blanks held by the several dies 303 indexed at the particular stations, as described below.

The die indicated at the position 303a in FIG. 27 is empty. The die indicated at 303b receives a cylindrical compressed blank 306 from compressor turret 201, as described above and shown in FIG. 26. The turret is indexed three more steps to bring the tampon blank to the die position indicated at 303e.

*Attaching the Withdrawal Cord*

The die structure is best shown in FIGS. 37 and 38. Each die 303 comprises a nylon-lined sleeve having a cylindrical chamber extending completely through it parallel to the axis of rotation of turret 301. As shown in FIG. 27 the front end of each die is slotted inwardly to provide a pair of aligned needle apertures 307 which are disposed along a radial line extending from the axis of rotation of the turret and slightly offset in a counterclockwise direction from the longitudinal center of the die. The offset of the needle apertures permits a hooked needle which is to be passed through the apertures to pull a withdrawal cord through the compressed blank off-center, and the slots allow the cord to be tightened on the tampon in the arrangement illustrated in FIG. 2K, and also allow the tampon with its cord to be ejected.

Mounted above turret 301 is a shaft 323 (FIGS. 28 and 29) which is driven in timed relation to the indexed rotation of turret 301 and which in turn, through suitable cams and linkages, drives the various elements which insert the loop of a withdrawal cord through the tampon, knot the ends of the cord, pull them through the loop and draw them tight to form a "larkshead" knot upon the tampon (FIGS. 2H, 2I and 2K), as will now be described.

When the turret has been indexed to a stop with the die at the position indicated at 303e (FIG. 27), a hooked needle 308 (FIGS. 27 and 29) is moved radially outwardly from the center of rotation of turret 301 (by means of a driven needle cam 309 rotated by shaft 323, and connecting linkage 310 through the slots 307, and slightly off-center through the compressed tampon blank held by die 303e. The hook of the needle catches a cord 311 (FIG. 27) held by a notched guide 324 in proper position above die 303e, and needle 308, actuated by cam 309, pulls a loop of this cord back through the compressed blank. Before needle 308 has engaged string 311, the advanced end of the string has been placed in a shuttle 312, which holds it for the time being. The supply of cord is led from a suitable source indicated at 313, via a cord tensioner 313a (FIG. 29) (omitted from FIG. 27 to avoid confusion of lines) and fairlead 313b, and through a flier tube 314 carried by an arm 315 which is pivotally mounted on fixed structure at 316 (FIG. 29). As soon as needle 308 has drawn the loop of cord 311 down until the lower end of the loop is held by the needle in the position of the needle indicated in FIG. 27 at 308, flier tube 314 is swung about pivot 316 by means of a cam 317 (FIG. 29) driven by shaft 323 and linkage indicated at 318 (FIG. 27) from the position shown in FIG. 27 to a position with the upper end of flier tube 314 reaching to shuttle 312. FIG. 29 shows flier tube 314 in this upper position, straddling notched guide 324, but shuttle 312 and associated elements have been omitted in FIG. 29 to avoid confusion of lines. Thus, flier tube 314 delivers a bight of cord to shuttle 312, which grasps this bight and holds it. Flier tube 314 then swings back to the position illustrated in FIG. 27, leaving a new length of cord 311 ready for the next tampon.

For ease of penetrating the compressed tampon, needle 308 is comparatively thin in transverse cross-section, and it is oriented with its broader transverse dimension parallel to the longitudinal axis of the tampon. The hook, as shown in FIG. 29 is formed inwardly from one of the thin edges.

Shaft 323 drives mechanism in gear box 325 (FIGS. 28 and 29), which mechanism comprises cams, linkages and shafts for driving certain elements which perform parts of the stitching or withdrawal cord appling operation. A shaft 326 (FIG. 29), driven by the mechanism, drives a unit 327 which operates the shuttle 312 and certain other elements described below.

A knotter mechanism 320 (FIG. 27) driven by unit 327 engages the two portions of the cord extending from the compressed tampon blank in die 303e and knots those two ends together, and an associated cutter then cuts off the two portions of string between shuttle 312 and knotter 320.

While all of the above-described action on the cord above die 303e is taking place, a suitably shaped loop-spreading device, moved by the mechanism 325, moves inwardly below die 303e, that is from the left as viewed in FIG. 29, between die 303e and needle 308 in its illustrated lower position of FIG. 27, and spreads the loop between the needle and the die 303e. The needle end 321 of a floating fid 322 indicated in FIG. 27 and illustrated, as seen from above, in FIG. 31 then moves inwardly within the loop.

Referring to FIG. 31, floating fid 322 is not attached to any thing but floats within a confined space between a pivoted assembly comprising a pair of spaced upper plates 332 and a lower plate 333, which assembly is pivoted at 334 to fixed structure 335. The assembly 332—332—333 is biased clockwise against a stop by a spring 336, to the position illustrated. Properly positioned on turret 301 with respect to each die 303 is a cam 337 which, upon indexing of turret 301, strikes a follower 338 carried by lower plate 333. In this manner, at the proper time in each cycle the point 321 of floating fid 322 is pivoted into position between the cord loop pulled down through the compressed tampon blank by hooked needle 308.

All of the above-described operations of pulling the withdrawal cord 311 through the compressed tampon blank, of stringing a new stretch of cord 311, knotting the ends of the cord extending through the tampon blank, cutting the ends, and spreading the loop below the tampon blank, have taken place while the turret has been stationary in the indexed position illustrated and described above with respect to die station 303e and have been performed on a fully compressed tampon blank without preforming a hole for the cord at any previous station. The turret is now indexed one step counterclockwise as seen in FIG. 27 until the die previously in position 303e reaches the position indicated at 303f. By means not shown the cord loop is released from the hook of needle 308. The motion of the die in moving between station 303e and 303f carries with it the severed cord 330, the knotted upper end of which may be seen trailing from die 303f in FIGS. 27 and 31. Knotted end 330 is carried through a string plate 331 best shown in FIG. 30. String plate 331 comprises a pair of flexible strips 328—328 which extend through an aperture 329 in plate 331 to provide a narrow channel 339 leading to a stop plate 339a. This channel is too narrow for the knot on the end 330 of the cord to pass through, so that the knot is held on top of strips 328—328 and pulled along to stop 339a, but a further pull on the string will deflect the free ends of strips 328 and release the knot. Thus, string plate 331 releasably maintains the knotted end 330 in the position illustrated in FIG. 27 directly above the loop spread by the diverging sides of fid 322 (FIG. 31).

At this point, a grabber 340 mounted on an arm 341 which is pivotally mounted at 342, is swung upwardly to the position illustrated in broken lines in FIG. 27, through the fid-spread lower loop of the withdrawal cord, to grasp the double knotted cord ends held by the string plate 331. In FIG. 31 knot 330 is shown over the loop formed by fid 322, just after release of knot 330 from stop plate 339a, but grabber 340 is omitted in this figure. The motion of grabber 340 is actuated by a cam 319 (FIG. 29) rotated by shaft 323 and linkages 343 (FIG. 27). The configuration of the grabber 340 is best indicated in FIG. 28 and comprises a pair of jaws which are spread apart axially (i.e. parallel to the axis of turret 301) by a suitable cam 344 as the grabber swings upwardly to the broken line position illustrated in FIG. 27. At this point cam 344 releases the jaws of grabber 340, which are spring biased together, so that they snap tightly together to grasp the knotted end of string 330 between the die 303f and the string plate 331. Grabber 340 then swings back to the full line position of FIG. 27, pulling the knotted cord ends out of string plate 331, down through the string loop held by floating fid 322 (which releases the loop), and thereby forming a "larkshead" knot and moderately tightening this knot around the die in the manner illustrated at succeeding stations of the die. Grabber 340 also pulls the knotted ends of the cords 330 into engagement with the spring biased gripper 345 mounted on turret 301 adjacent die 303f. A gripper 345 is provided for each die 303.

It will be noted that the withdrawal cord, from the time it is taken from the supply at 311, is kept under control by means including string plate 331, the loop spreading floating fid 322, and gripper 345, thus keeping the cord from fouling or being fouled by any mechanisms as the turret is indexed.

Slidably mounted in the bore of each die 303 and extending to the rear out of the back thereof is a positioning plunger 304 best shown in FIG. 42. These plungers and their associated mechanism have been omitted in FIGS. 28 and 29 to avoid confusion of lines. FIG. 42 shows the positioning plunger ejecting a finished tampon 399, and its outer end is just inside the outer end of die 303. The outer end of plunger 304 has an approximately semihemispherical cavity to fit the hemispherical nose of the tampon, and may, if desired, be used to shape the nose of the tampon as explained below. A carriage 346 is fixed to the inner end of plunger 304. Carriage 346 carries a cam follower 347 and is supported and kept rotationally oriented by a guide rod 348 mounted on turret 301 and extending from the rear thereof parallel to the axis of rotation of the turret. Also carried by carriage 346 is a roller 349 through which outward forces may be applied to plunger 304 at any desired indexed station of die 303 by suitable mechanism mounted on tool plate 305, for example by the ejection cylinder and piston rod 350 shown in FIG. 42. The several positioning plungers 304 are kept in their designed longitudinal positions by means of inner and outer cam strips 351 and 352 which engage cam follower 347. These cam strips are disposed where needed around the turret and are not continuous. At each station in which substantial force is applied to plunger 304 such force is applied through roller 349 rather than upon cam follower 347.

*Stick Hole Forming*

At the two successive die stations illustrated at 303h and 303i in FIG. 27, a longitudinal recess is formed and shaped in the end of the compressed tampon blank adjacent the withdrawal cord, so that an inserter stick may be inserted therein. At the same time, if desired, the hemispherical nose of the tampon may be formed, with the final longitudinal compression, instead of performing this operation in the compression turret as described above in connection with FIG. 25. Mechanism shown in FIGS. 32 to 38 is adapted to perform simultaneously in two steps, the nosing operation and the stick hole forming operation or either operation alone.

The operation at the station 303h is indicated in FIG. 32, and that at station 303i in FIG. 33. Enlarged sectional views of the parts engaging the tampon blank at these two stations are shown respectively in FIGS. 37 and 38. When turret 301 has been indexed into position an air-powered piston drives plunger 353 against roller 349 on the carriage of positioning rod 304h and forces the latter to the right. Simultaneously, a plunger 354, shown in FIGS. 33 and 37, moves the upper end of a lever 354a to the right about a pivot 355, thereby moving a pressure rod 356 (FIGS. 36 and 37) to the left as viewed in FIGS. 32 and 33. This forces to the left a pair of backup members 357, 357a at the stations illustrated in FIGS. 32 and 33 respectively, into the open ends of dies 303h and 303i and against the tampon blanks indicated at 306h and 306i. The compressed tampon blank is thus firmly held compressed between plunger 304h and backup 357. Immediately thereafter a piston driven by air cylinder 358 strikes the end of a plunger 359 from the right, forcing a pointed forming tool 360 axially into the end of the compressed tampon blank, alongside the parts of the withdrawal cord which extend through the tampon (omitted in FIGS. 32–39 but as illustrated in FIG. 21). Plunger 359 with tool 360, and backup 357 are then withdrawn, the pressure on plunger 353 at the same time being released, and turret 301 is ready to be indexed to bring the die to the station indicated at 303i in FIG. 27. When the turret has been indexed to this station, backup member 357a is brought into position against the outer end of the tampon 306i as illustrated in FIGS. 33 and 38 in the same manner as described above in connection with FIGS. 32 and 37. Simultaneously, an air cylinder actuates its plunger 364 to the right as illustrated in FIG. 33 to strike roller 349 and thereby apply a force against plunger 304i to the right against the nose of the tampon. The tampon thus being again firmly held between a plunger 304i and a backup 357a, an air cylinder 361 is actuated to force a plunger 362 to the left (as viewed in FIG. 33) to force a forming tool 363 into the recess previously formed at station 303h, to shape the recess properly for receiving the inserter stick to be inserted into the tampon at a subsequent station. The pressure on 361, 364 and 354 is then reversed to withdraw the tool 363 and to release the pressure on the backup plungers 304, 357 and 357a, completing the cycle so that the turret is ready to be indexed again.

FIGS. 34 and 35 illustrate the arrangement of cams 351 and 352 in the vicinity of the die stations 303h and 303i of FIG. 27. A section of cam 352 guides cam follower 347 to keep it in the desired position as the turret brings it from the left as viewed in FIG. 34 into alignment with plunger 353 so that the latter can act on roller 349 of positioning plunger 304 in the manner described above in connection with FIG. 32. In order to maintain the plunger 304 against the nose of the tampon between the stations here illustrated, a pivoted plate 365, pivotally mounted at 366 on tool plate 305 and pivotally mounted at its other end at 367 to plunger 364, bears against roller 349 as the turret is indexed between the two stations illustrated. When the nosing operation is performed at the die stations illustrated in FIGS. 32 and 33 (instead of at the station of the compressor turret illustrated in FIG. 25) the member 304 is advanced as indicated at 368 in FIG. 32 and then as indicated at 369 in FIG. 33.

*Stick Inserter*

After the turret has been indexed two additional steps, the tampon blank under consideration reaches the die position illustrated at 303k in FIG. 27, in position for the insertion of the inserter stick as illustrated in FIGS. 39 and 40. The inserter stick mechanism is indicated generally at 370 in FIG. 27 and, as shown in FIG. 40, comprises a bin 371 for sticks which fall into grooves 372 of a feed wheel 373 which feeds successive sticks step-by-step in synchronism with the indexing of turret 301 onto a stick support 374. The sticks are held against the feed wheel by a cylindrical retainer wall until they reach an opening therein above a shaped receiving surface in stick support 374. Stick support 374, as shown in FIG. 40, is pivotally supported by arms 375 and 376 for rotation about a horizontal axis 377. Stick support 374 is moved up to and down from the position illustrated in FIGS. 39 and 40 by means of a cam follower 378 and a cam 379 which is rotated in timed relation to the indexed rotation of turret 301, so that stick support 374 is moved down and out of the way for indexing the turret after the stick has been inserted.

Referring to FIG. 39, a plunger 380 is slidably mounted in journals 381 and 382 for movement to the right and left. Fixed to plunger 380 is a member 383 which carries a stick pusher 384 having a recess into which fits the outer or left end of the stick 385 delivered by feed wheel 373 onto stick support 374. By means described below plunger 380 is reciprocated from the stick receiving position, which is to the left of the position shown in FIG. 39, to the right to insert the right or inner end of stick 385 into the previously formed recess 386 in the end of tampon 387. FIG. 39 shows the mechanism in position as the stick is entering the recess.

A compression spring housed in member 388 urges plunger 380 to the right, but the reciprocating motion of plunger 380 is governed through a roller 389 which rides in a transverse slot in the lower end of member 383, roller 389 being rotatably mounted on one end of a lever 390. Referring to FIG. 40, lever 390 is pivotally mounted at 391 for rotation about a vertical axis and carries at its other end a follower 392 which is moved by the axial face of a cam 393 which is rotated by the same shaft which rotates the cam 379 of the stick supporter mechanism. Thus, stick pusher 384 cooperates with stick support 374 to push stick 385 into the recess 386 of tampon 387 each time a tampon is brought into the indexed position indicated at 303k in FIG. 27, whereupon support 374 dips out of the way for indexing of the turret, members 374 and 384 then returning into position for receiving the stick for next tampon.

*Cord Tightener*

Turret 301 is next indexed two more steps counterclockwise until the tampon under consideration has reached the position indicated in the die at 303m. At this station a cord tightener illustrated in FIGS. 41 and 41A performs its function. The cord tightener comprises a disk 395 mounted for rotation with a shaft 398 which is radial with respect to the axis of turret 301. In timed relation disk 395 is rotated counterclockwise as viewed in FIG. 41. Pivotally mounted on disk 395 to overlie a part of the rim of this disk is a rocker 396 having an outer arcuate surface. Mounted outside the trailing edge of rocker 396 is a wing 397 which extends tangentially in a rotationally forward direction with respect to the outer surface of the rocker. Rocker 396 is suitably spring biased to normally press outwardly against wing 397, so that a notch 394 is formed between rocker 396 and wing 397. The rotation of disk 395 carries notch 394 into the path of the doubled withdrawal cord stretched between die 303m and cord holder 345 (FIG. 41A), and the withdrawal cord is caught in this notch and moved to the left as viewed in FIGS. 27 and 41A, so as to be pulled out of the cord retainer 345. As disk 395 continues its rotation cord 330 is pulled from its previous position around a portion of the end of die 303m and into alignment with the slots 307 in the end of die 303m. Further rotation of disk 395 pulls cord 330 into slots 307 and draws cord 330 into a tight knot embracing the tampon and the withdrawal stick $k$ as illustrated in FIG. 2K. Means not shown then engages the trailing edge of rocker 396 to move it inwardly slightly from wing 397 so as to release the knot at the end of withdrawal cord 330 at a point adjusted to bring the desired amount of tension upon the withdrawal cord. Withdrawal cord 330 thus falls clear, disk 395 rotates clear of the die 303m, and the turret is ready to be indexed to the position for ejecting the finished tampon.

*Tampon Ejector*

The turret is then indexed to bring the tampon under consideration to the die station indicated at 303n. At this station the ejector mechanism illustrated in FIG. 42 operates. Ejector cylinder 350 operates to move its plunger to the right as viewed in FIG. 42, to strike the roller 349 on the carrier 346 of positioning plunger 304, moving the plunger to the extreme right position illustrated, and ejecting the tampon 399 outwardly to the right into a discharge chute 400. The air to cylinder 350 is reversed, withdrawing its piston rod into position for the next cycle. Turret 301 is then indexed three more steps to bring the die under consideration to the die position illustrated at 303b, when a new compressed cylindrical blank is inserted to start a new cycle for this particular die.

*Orientation of Tampon Blank*

Referring to FIG. 1, it will be noted that conveyor 144, compressor turret 201, and compressor turret 301 with the tools of assemblies 200 and 300 are synchronized and operate together in step-by-step fashion to convert precompressed blanks 142 into the finished tampons 399 (FIG. 42). It will also be noted that the orientation of the blanks is controlled at the point of transfer from conveyor 144 to turret 201 (at section line 23—23, illustrated in FIG. 23), so as to place each blank 142 with its width disposed across the width of the open compression chamber. In this way the orientation of the original separation line between batt sections $a$—$b$ (FIG. 2A) is kept in a controlled relationship with respect to the radius of compressor turret 201, that is, perpendicular thereto. When the compressed cylindrical blank is transferred from turret 301 in the position illustrated at section 26—26 of FIG. 20, the orientation of the original separation line between batts $a$ and $b$ is thus maintained perpendicular to the radius of turret 301. Thus, referring to FIG. 27, when the compressed cylindrical blank is indexed to the position illustrated at position 303e, the original separation line between batts $a$ and $b$ is disposed perpendicularly with respect to the line of action of needle 308 as the latter moves outwardly radially from the axis of finishing turret 301.

*Operation*

The operation of the apparatus has been described in detail above, and may be summarized as follows, referring to FIG. 1:

Batt material 51 and 52 from supply 50 is cut into sections by cutter-stacker 53, and stacked as indicated at 59. A conveyor moves spaced pairs of batts 59 into a strip of gauze supplied from a roll 60, and each pair of batts is folded into a tube of the gauze at 64. The gauze is cut between batts at 65 to form untucked pledgets which are moved by conveyor 67 to tucker turret 70, in which the gauze ends are tucked between the batts to form tucked pledgets. The pledgets are transformed in succession to precompressor assembly 100, in which they are partially compressed transversely to rectangular cross-section and then while so held are overcompressed longitudinally below the final length of the tampon. They are then released longitudinally as precompressed blanks which reexpand in about one minute to a length slightly less than or approximately the same as the length of the finished tampon, a height slightly less than, and a width substantially greater than the corresponding dimensions of the finished tampon.

All of the apparatus mentioned thus far is geared together and driven by a single motor, and it operates completely automatically to produce precompressed blanks 142 from the supply of batt material 59 and gauze 60.

The precompressed blanks are moved by a conveyor 141 to an inspection and loading station 143, where they are loaded by hand into a feeding or loading conveyor 144. Conveyor 144 and all of the apparatus mentioned below are geared together and driven by a single motor, with all parts driven or controlled by the motion of said motor, so that from supplies of precompressed blanks, cord, and inserter sticks, finished tampons are produced automatically.

Blanks 142 from conveyor 144 are fed in succession by means 161 into compressor turret 200, in which they are compressed in width to their final circular cross-section, with resulting spreading in length at a free end to partially form a rounded nose. Either in this turret or in the finishing turret, as mentioned below, the cylindrical tampon blank is compressed longitudinally with a cup-shaped nosing tool to form a hemispherical nose and reduce the blank to its finished length.

The compressed tampon blank is transferred to the finishing assembly 300. At one indexed station, without preforming of a hole in any previous step, a withdrawal cord loop is pulled through the substantially fully compressed tampon by a hooked needle, and the other ends of the cord are cut off and knotted. At the next station the knotted ends are pulled through the loop and drawn tight to form a "larkshead" knot. At later stations a stick hole is formed in the outer end of the fully compressed tampon. At the same time the final nosing operation may be performed on the other end instead of in the compressor turret as mentioned above. At succeeding stations an inserter stick is placed in the hole, the withdrawal cord is tightened and the finished tampon 399 is ejected.

The apparatus controls the orientation of the product so that the sides and ends of the precompressed blank are the same as those of the original pledget, so that the final transverse compression is in a direction parallel to the original plane between the batts, and so that the withdrawal cord is in a direction perpendicular to the direction of the final transverse compression. This insures that the needle which pushes through the compressed blank will not be deflected, and has the additional advantage of insuring that the withdrawal cord will pass through the overlapped gauze on the top side of the original pledget (see c in FIG. 2C).

Throughout the apparatus, contact of the product with metal is kept to a minimum, and metal-to-metal contacts adjacent to or in contact with the product are particularly avoided. The precompressor and compressor dies are metal alloy, but they are spaced from each other by a definite clearance, and the plungers which enter these dies are preferably nylon. In the finishing dies the positioning plungers which support and/or form the noses of the tampons are steel, but the dies are nylon-lined. By these measures the risks of metal particles getting into the tampon are minimized.

Although the drawings illustrate a cylindrical tampon the surface of which is circular in transverse cross-section, and the apparatus illustrated shows dies which form and hold a tampon of this shape, it will be appreciated that both method and apparatus may be adapted for making tampons of any desired cross-section including, for example, tampons which are oval or elliptical in transverse cross-section. In the claims "cylindrical" means "having an external surface which is substantially traced, along the major portion of its length, by a straight line parallel to the longitudinal axis of the tampon moving parallel thereto along a closed path which is substantially curved."

It will be seen that the method and apparatus described above give various advantages over the prior art, in ease of manufacture and in quality of the product. Changes within the scope of the appended claims will be apparent to those skilled in the art.

We claim:

1. The process of making an elongate cylindrical compressed tampon from an elongate mass of uncompressed fibrous material, comprising compressing said mass transversely simultaneously in two mutually perpendicular directions, then while holding said mass thus transversely compressed compressing it longitudinally, then releasing said mass longitudinally to freedom from compression, then compressing said mass transversely to a cylindrical shape approximating the shape of the finished tampon, and then, while holding said mass against transverse re-expansion, compressing it longitudinally to the shape of the finished tampon.

2. In a tampon compressor, a compressor assembly comprising a pair of opposed jaws on opposite sides of a compression chamber, said jaws being mounted for relative movement along a line toward and away from each other, and means for moving said jaws relatively to each other along said line between an open position and a closed position, each said jaw having a concave compression surface and upper and lower sealing surfaces extending parallel to said line respectively from the upper and lower edges of said compression surface, the upper sealing surfaces of said jaws being parallel and spaced slightly from each other to provide one lateral frictionless seal for said compression chamber, the lower sealing surfaces of said jaws being parallel and spaced slightly from each other to provide another lateral frictionless seal for said compression chamber.

3. A compressor assembly in accordance with claim 2, said upper and lower sealing surfaces extending in opposite directions from said compression chamber.

4. A compressor assembly in accordance with claim 2, each said concave compression surface comprising a flat surface inclined with respect to and bordering a sealing surface of the same jaw.

5. A compressor assembly in accordance with claim 4, said upper and lower sealing surfaces extending in opposite directions from said compression chamber.

6. In a tampon compressor, a compressor assembly comprising a first jaw, a second jaw pivotally mounted with respect thereto for rotation about a pivot axis, each said jaw having a concave compression surface, one on each side of a compression chamber, and means for moving said jaws relatively to each other around said axis to move said compression surfaces toward and away from each other between an open position and a closed position, each said jaw having inner and outer cylindrical sealing surfaces centered on said axis and extending respectively from two edges of its compression surface which are respectively closer to and farther from said axis, said inner cylindrical sealing surfaces coacting to provide one lateral seal for said compression chamber, said outer cylindrical sealing surfaces coacting to provide another lateral seal for said compression chamber.

7. A compressor assembly in accordance with claim 6, said inner and outer cylindrical sealing surfaces extending in opposite directions from said compression chamber.

8. A compressor assembly in accordance with claim 6, said inner cylindrical sealing surfaces of said jaws being slightly spaced from each other to provide one frictionless seal, said outer cylindrical sealing surfaces of said jaws being slightly spaced from each other to provide another frictionless seal.

9. A compressor assembly in accordance with claim 8, said inner and outer cylindrical sealing surfaces extending in opposite directions from said compression chamber.

10. A compression assembly in accordance with claim 6, wherein each said concave compression surface comprises a flat surface inclined with respect to and bordering a cylindrical sealing surface of the same jaw.

11. A compressor assembly in accordance with claim 10, said inner and outer cylindrical sealing surfaces extending in opposite directions from said compression chamber.

12. A compressor assembly in accordance with claim 11, said inner cylindrical sealing surfaces of said jaws being slightly spaced from each other to provide one frictionless seal, said outer cylindrical sealing surfaces of said jaws being slightly spaced from each other to provide another frictionless seal.

13. A tampon compressor comprising a turret rotatable around its axis, a plurality of compressor assemblies mounted on said turret, each said assembly comprising a pair of opposed jaws mounted on opposite lateral sides of a laterally enclosed axially open-ended compression chamber which extends parallel to said axis, said jaws being laterally movable relatively to each other between an open position and a closed position, means for rotating said turret to bring each of said compression chambers to a receiving station and to a discharge station, means for moving the jaws of each assembly to said open position for receiving tampon material at said receiving station, means for feeding tampon material axially into each chamber at said receiving station, means for moving the jaws of each assembly to its closed position to compress said material laterally before said material reaches said discharge station, and means for discharging said material axially from each chamber at said discharge station.

14. A tampon compressor in accordance with claim 13 wherein each said pair of opposed jaws comprises a first jaw rigid to said turret and a second jaw pivotally mounted in said turret for rotation about a pivot axis parallel to the axis of said turret.

15. A tampon compressor in accordance with claim 13 wherein said tampon material is fed into each chamber from one axial side of said turret and discharged from each chamber out of the other axial side of said turret.

16. A tampon compressor in accordance with claim 13 comprising means between said receiving and discharge stations for compressing said material in a direction parallel to the axis of said turret.

17. A tampon compressor in accordance with claim 16 comprising backup means movable into position at one axial end of one of said compression chambers and a plunger movable axially into the other end thereof.

18. A tampon compressor in accordance with claim 16 having in combination with each said assembly a backup member at one axial end thereof and means for moving said backup member into and out of position at the corresponding end of the chamber thereof.

19. A tampon compressor in accordance with claim 18 having in combination with each said assembly a plunger movable axially into the other end of the chamber thereof.

20. A tampon finishing assembly comprising a turret, a plurality of tampon dies on said turret, means for rotating said turret around its axis and indexing it successively in a plurality of positions to bring each of said dies to a plurality of successive stations including a loading station and at least one operating station, means at said loading station for placing a compressed tampon blank in a die indexed thereat, said tampon blank having been compressed longitudinally and transversely and having neither a preformed path of weakness nor a channel therethrough suitable for passing a cord through said tampon blank, a hole forming needle mounted at one of said stations for reciprocation along a radial line from the axis of said turret, said needle having a hooked end for engaging a withdrawal cord, means for reciprocating the hooked end of said needle in a single cycle through said tampon and back to pierce said tampon blank and pass the loop of a withdrawal cord therethrough during said cycle, means for spreading said loop laterally from said tampon blank in a direction along the line of movement of said dies, means for disposing the ends of said withdrawal cord not passed through said tampon blank approximately parallel to said loop, and means for passing said ends through said loop to form a knot.

21. Means for making a covered compressed mass of material from a partially covered uncompressed elongate mass of said material, said mass being partially covered by a tubular cover which surrounds its lateral sides and has end portions which extend beyond its respective longitudinal ends, comprising tucking apparatus, means for inserting said partially covered mass into said apparatus, means in said apparatus for tucking the end portions of said cover into the longitudinal ends of said mass to completely cover the latter, a compressor coacting with said apparatus, means for transferring the covered mass from said apparatus to said compressor, means in said compressor for simultaneously compressing said covered mass in two transverse directions, means for compressing said covered mass longitudinally while holding it thus compressed transversely, and means for ejecting the covered compressed mass from said compressor longitudinally.

22. Apparatus for making tampons from blanks of absorbent material, comprising a compressor turret having a plurality of compressor chambers, means for inserting successive blanks into successive chambers, means for compressing the blanks in said chambers to compressed blanks having approximately the size and shape of finished tampons, a finishing turret coacting with said compressor turret, means for transferring the compressed blanks in succession from said compressor turret to said finishing turret, first finishing means coacting with said finishing turret for attaching a withdrawal cord to one end of each compressed blank in succession, second finishing means coacting with said finishing turret for forming a recess in said one end of each compressed blank in succession, third finishing means coacting with said finishing turret for inserting a stick into the said recess in each compressed blank in succession to thereby make a succession of completed tampons, and means for ejecting said tampons in succession from said finishing turret.

23. Apparatus in accordance with claim 22 comprising coacting means for forming a rounded end on each compressed blank on the end thereof opposite said one end.

24. The process of making a sanitary product from fibrous material which comprises compressing, in a series of compressing operations, a mass of said material into a highly compacted body of uniform fiber density having substantially the external shape and size of the finished article and then inserting a withdrawal cord through a highly compacted portion of said body.

25. The method of forming an elongate compressed tampon consisting of the steps of forming a fibrous blank, compressing said blank to substantially the final tampon shape and dimensions and to substantially uniform fiber density, passing a looped cord transversely through the compressed tampon thus formed at a position adjacent one end thereof, inserting the free ends of the cord through the looped portion thereof, forming an axial bore in the cord pierced end of the tampon, enlarging and shaping said bore for the reception of a stick applicator in said enlarged bore, and drawing the free ends of the cord taut to effect a larkspur knot.

26. The process defined by claim 1 comprising performing the steps recited therein and thereafter inserting a withdrawal cord transversely through a compressed portion of said mass.

27. The method of making an elongate compressed tampon having a central longitudinal axis, comprising the steps of compressing, in a series of compressing operations, a mass of fibrous material into a highly compacted body of uniform fiber density having substantially the external shape and size of the finished tampon, and then inserting a withdrawal cord transversely through a highly compacted portion of said body at a position adjacent one of its ends and offset from its longitudinal axis.

28. The method defined by claim 27, comprising: thereafter forming an axial bore in said one of its ends and inserting an applicator stick therein.

References Cited in the file of this patent

UNITED STATES PATENTS

| | | |
|---|---|---|
| 2,087,847 | Morley | July 20, 1937 |
| 2,123,750 | Schulz | July 12, 1938 |
| 2,152,493 | Newman | Mar. 28, 1939 |
| 2,425,004 | Rabell | Aug. 5, 1947 |
| 2,462,178 | Ganz | Feb. 22, 1949 |
| 2,678,229 | Shortland | May 11, 1954 |
| 2,688,163 | Burger et al. | Sept. 7, 1954 |
| 2,690,597 | Greiner et al. | Oct. 5, 1954 |
| 2,715,374 | Carrier | Aug. 16, 1955 |
| 2,926,394 | Bletzinger et al. | Mar. 1, 1960 |

UNITED STATES PATENT OFFICE
CERTIFICATE OF CORRECTION

Patent No. 3,131,435                                        May 5, 1964

Henry Robert Cloots et al.

It is hereby certified that error appears in the above numbered patent requiring correction and that the said Letters Patent should read as corrected below.

Column 6, line 57, after "spaced" insert -- apart --; column 9, line 52, for "coating" read -- coacting --; column 10, line 36, for "pivotal" read -- pivoted --; line 63, for "A" read -- As --; column 11, line 26, for "or" read -- of --; column 12, line 39, for "in" read -- is --; column 16, line 11, for "station" read -- stations --; column 20, line 17, for "transformed" read -- transferred --.

Signed and sealed this 3rd day of August 1965.

(SEAL)
Attest:

ERNEST W. SWIDER                                                  EDWARD J. BRENNER
Attesting Officer                                                       Commissioner of Patents